United States Patent [19]
Ben-Nun et al.

[11] Patent Number: 5,649,110
[45] Date of Patent: Jul. 15, 1997

[54] TRAFFIC SHAPING SYSTEM WITH VIRTUAL CIRCUIT TABLE TIME STAMPS FOR ASYNCHRONOUS TRANSFER MODE NETWORKS

[76] Inventors: Michael Ben-Nun, Derech Hahoresh 34/2, Ramot, Jerusalem, Israel; Simoni Ben-Michael, 13/3 Mitzpe st., Givat Zeev, Israel, 90917; Moshe De-Leon, Gan Rehavia, Entrance C, Apartment 5, Jerusalem, Israel, 92461; Peter John Roman, 89 Front St., Hopkinton, Mass. 01748; Kadangode K. Ramakrishnan, 11 Michael Rd., Maynard, Mass. 01754; G. Paul Koning, 7 Oak Dr., Wilton, N.H. 03086

[21] Appl. No.: 335,281

[22] Filed: Nov. 7, 1994

[51] Int. Cl.[6] ........................................ G06F 3/00
[52] U.S. Cl. ............................ 395/200.19; 395/849
[58] Field of Search ..................... 395/200, 200.19, 395/200.01, 309, 859, 872, 849

[56] References Cited

U.S. PATENT DOCUMENTS

| | | | |
|---|---|---|---|
| 4,506,358 | 3/1985 | Montgomery | 370/60 |
| 5,132,961 | 7/1992 | Thiebaut | 370/13 |
| 5,138,607 | 8/1992 | Thiebaut | 370/13 |
| 5,353,430 | 10/1994 | Lautzenheiser | 395/872 |
| 5,467,342 | 11/1995 | Logston | 370/17 |
| 5,488,607 | 1/1996 | Vinel | 370/17 |
| 5,577,222 | 11/1996 | Micka | 395/849 |

*Primary Examiner*—Eric Coleman
*Attorney, Agent, or Firm*—David A. Dagg; Gary E. Ross; Arthur W. Fisher

[57] ABSTRACT

A system for controlling the transmission of cells from a network node over multiple virtual circuit is disclosed. The disclosed system performs traffic shaping for all virtual circuits connected with the network node. The system includes a virtual circuit table with one or more entries. Each virtual circuit table entry corresponds to a virtual circuit established with the network node. Each virtual circuit table further includes one or more Cell Rate Accumulator fields and a Time Stamp field. The system includes a schedule table having one or more entries. Each schedule table entry further includes one or more Cell Rate Accumulator fields and corresponding predetermined value fields. A schedule table loading process determines a virtual circuit on which a packet is to be transmitted, and then calculates a time elapsed since a last previous write of a virtual circuit table entry corresponding with that virtual circuit. The schedule table loading process then adds the time elapsed to the value of the Cell Rate Accumulator fields in that virtual circuit table entry, and stores the result of the addition into the corresponding Cell Rate Accumulator fields of the schedule table entry. The system further includes a process for periodically incrementing the Cell Rate Accumulator fields in the schedule table entry. A scanning process periodically increments the Cell Rate Accumulator fields. A transmitting process transmits a cell on the virtual circuit when the value of the Cell Rate Accumulator fields is greater than or equal to the corresponding predetermined values.

23 Claims, 11 Drawing Sheets

SCHEDULING TABLE ENTRY

POST PROCESSING

SCHEDULING TABLE ENTRY

SCANNING

SELECTING

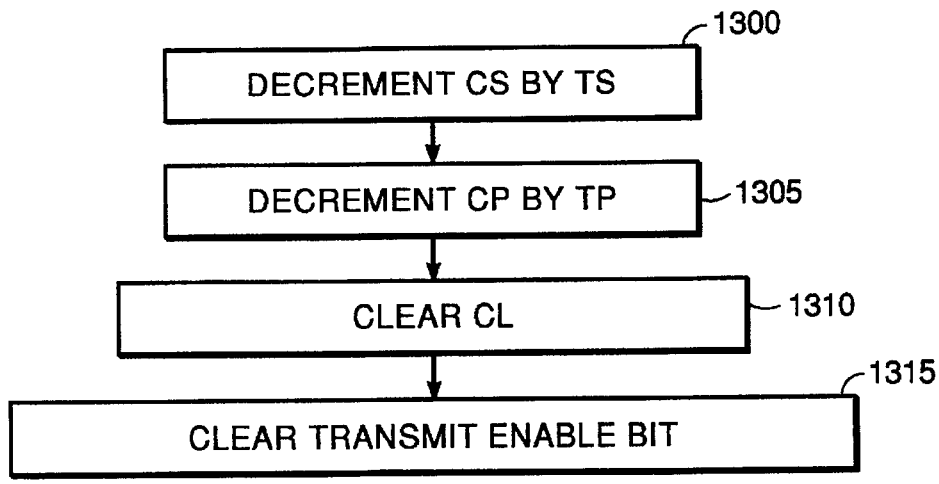

```
         ┌─────────────────────────┐ ╱─1300
         │   DECREMENT CS BY TS    │
         └───────────┬─────────────┘
                     ▼
         ┌─────────────────────────┐ ╱─1305
         │   DECREMENT CP BY TP    │
         └───────────┬─────────────┘
                     ▼
         ┌─────────────────────────┐ ╱─1310
         │        CLEAR CL         │
         └───────────┬─────────────┘
                     ▼
     ┌───────────────────────────────┐ ╱─1315
     │   CLEAR TRANSMIT ENABLE BIT   │
     └───────────────────────────────┘
```

*FIG. 13*

```
  1405 ╲              ╱─ 1410
  ┌─────┬──┬──────────────┐
  │ EXP │  │    PERIOD    │
  └─────┴──┴──────────────┘
    │    ││               │
    11   87               0
```

*FIG. 14*

```
  ╱─1505      ╱─1510
 PERIOD    RATE (Mbps)
    0         169.600 ⎤
    1         168.940 ⎬ ~ 0.4%
    2         168.285 ⎦  STEP 254         85.133 ⎤ ~ 0.2%
   255         84.966 ⎦  STEP
```

*FIG. 15*

| ╱─1605 | ╱─1610 | ╱─1615 |
|---|---|---|
| EXP | TS (12 BITS) | CS, BS (20 BITS EACH) |
| 0  | 1.XXXXXXX000 | XXXXXXXX.XXXXXXXXXXXX |
| 1  | 1X.XXXXXX000 | XXXXXXXXX.XXXXXXXXXXX |
| 2  | 1XX.XXXXX000 | XXXXXXXXXX.XXXXXXXXXX |
| 3  | 1XXX.XXXX000 | XXXXXXXXXXX.XXXXXXXXX |
| 4  | 1XXXX.XXX000 | XXXXXXXXXXXX.XXXXXXXX |
| 5  | 1XXXXX.XX000 | XXXXXXXXXXXXX.XXXXXXX |
| 6  | 1XXXXXX.X000 | XXXXXXXXXXXXXX.XXXXXX |
| 7  | 1XXXXXXX.000 | XXXXXXXXXXXXXXX.XXXXX |
| 8  | 1XXXXXXX.000 | XXXXXXXXXXXXXXXX.XXXX |
| 9  | 1XXXXXXX0.00 | XXXXXXXXXXXXXXXXX.XXX |
| 10 | 1XXXXXXX00.0 | XXXXXXXXXXXXXXXXXX.XX |
| 11 | 1XXXXXXX000  | XXXXXXXXXXXXXXXXXXX.X |

*FIG. 16*

1700
TCA ENTRY

SCHEDULE TABLE LOAD FROM VCST

SELECTION PROCESS

VIRTUAL CIRCUIT TABLE WRITE

TRAFFIC SHAPING SYSTEM WITH VIRTUAL CIRCUIT TABLE TIME STAMPS FOR ASYNCHRONOUS TRANSFER MODE NETWORKS

FIELD OF THE INVENTION

The disclosed invention relates generally to systems for providing predetermined qualities of service over multiple virtual circuits in a communications network, and more particularly to a system for traffic shaping in a network station operating on an Asynchronous Transfer Mode (ATM) network.

BACKGROUND

Asynchronous Transfer Mode (ATM) is a networking technology which will be used in a variety of telecommunications and computing environments. ATM is designed to support users having diverse requirements for service. For example, ATM will support both Constant Bit Rate (CBR) and Variable Bit Rate (VBR) types of connections. Further, ATM is intended to provide flexible use of network bandwidth.

ATM is a connection oriented technology. Before data can be transferred between two stations, a connection (also referred to as a Virtual Circuit or VC) must be established between them. A first end station requests a connection to a second end station by submitting a connection request to a User to Network Interface (UNI) with the network. After a virtual circuit has been established, end stations exchange information by sending and receiving ATM "cells" containing data. An ATM cell is a fixed length packet used to relay data between network stations.

A major function of a station on an ATM network is supporting the Quality of Service (QoS) for each virtual circuit to which the station is connected. QoS is established for each virtual circuit when the circuits are set-up. Examples of QoS parameters that are specified in a connection request include loss rate, acceptable delay, and peak and average cell rates. In addition, when peak and average cell rates are specified, a burst size of the number of cells that can be transmitted at the peak cell rate can also be specified.

The network initially uses the QoS parameters in the connection request for admission control. When a request is made at a first end station for a connection with a second end station, the network and the second end station determine whether sufficient resources (transmission bandwidth, buffers, or other) exist to allow the connection to be established with the requested parameters, while not impacting the QoS of already established connections. If there are insufficient resources to support the requested QoS, the connection request is rejected, and request may subsequently be repeated with lower QoS parameters.

Once a connection is established, the network may ensure that each transmitting station meets and does not exceed, the QoS for each VC within that station. This is done through two complementary procedures, traffic shaping at the transmitting end station and each intermediate station, and traffic policing at each intermediate station and the receiving end station. Traffic shaping refers to steps performed by transmitting end stations and intermediate stations to ensure the transmission rate for any given VC does not exceed the peak or average data rate and burst characteristics allowed for that VC.

Traffic policing may be performed by intermediate network stations between the end stations of a connection, and by the receiving end station when receiving the forwarded cell. If an intermediate station or a receiving end station detects persistent transmission rates in excess of the QoS for a VC, it may take a variety of actions, including alerting network administrators, discarding cells, or adopting other congestion management schemes. Correct operation of the network and consistent service levels require that traffic shaping be used to pace cell streams transmitted from the end stations of an ATM network.

A known mechanism for controlling both the peak and average transmission rates for a single VC is referred to as the "Double Leaky Bucket" system. The Double Leaky Bucket system determines whether a VC can transmit a cell at a given point in time without exceeding the QoS parameters for that VC. In an ATM adapter for a network end station, which must simultaneously support Quality of service monitoring for a large number of VCs, implementing excessively complex Double Leaky Bucket logic for each individual potential VC is impractical in terms of chip silicon area and die size.

Also in ATM there is defined a ABR (Available Bit Rate) service, which does not specify peak and sustainable cell rate for a connection. ABR connections simply use whatever available bandwidth is dynamically available in the network, still allowing other connections the quality of service they have negotiated. Some users of ABR services may be latency sensitive. A network device that is capable of providing timely service to latency sensitive ABR connections is therefore desirable, in order to allow for interactive applications to work well even under heavy load conditions.

There is therefore a need for a new system for traffic shaping on ATM network stations. The new system should minimize the amount of logic required to be implemented in hardware or silicon so that it can be used efficiently to support large numbers of VCs in an ATM adapter for an end station on an ATM network. The new system should accurately and fairly control the transmission rate for each VC on a network station without using excessively complex Double Leaky Bucket circuits for each possible VC on the network station.

SUMMARY

In accordance with principles of the invention, there is provided a system for controlling the transmission of cells from a network node over multiple virtual circuits. The disclosed system performs traffic shaping for all virtual circuits connected with the network node.

The system includes a virtual circuit table with one or more entries. Each virtual circuit table entry corresponds to a virtual circuit established with the network node. Each virtual circuit table entry includes one or more Cell Rate Accumulator fields, one or more corresponding predetermined value fields, and a time stamp field used to store the time at which the entry was last written.

The system also includes a schedule table having one or more entries. Each schedule table entry further includes one or more Cell Rate Accumulator fields and corresponding predetermined value fields. The predetermined value field for a given Cell Rate Accumulator field is used to store a value representing a minimal time period required between cell transmissions.

A schedule table loading process determines a virtual circuit on which a packet is to be transmitted, and then calculates a time elapsed since a last previous write of a virtual circuit table entry corresponding with that virtual circuit. The schedule table loading process then adds the time elapsed to the value of each of the one or more Cell Rate Accumulator fields in that virtual circuit table entry, and stores the result of the addition into corresponding Cell Rate Accumulator fields of the schedule table entry.

The system further includes a process for periodically incrementing the Cell Rate Accumulator fields in the schedule table entry. A scanning process periodically increments each Cell Rate Accumulator field. A transmitting process transmits a cell on the virtual circuit when the value of each given Cell Rate Accumulator field is greater than or equal to the corresponding predetermined value.

In an example embodiment, the system is implemented as one or more processes in an Application Specific Integrated Circuit. Other embodiments include implementation of the system as one or more software processes executing on a microprocessor.

These and other features and advantages of the present invention will become apparent from a reading of the detailed description in conjunction with the attached drawings in which like reference numerals refer to like elements in the several views.

BRIEF DESCRIPTION OF THE DRAWINGS

FIG. 13 is a diagram showing the steps of a second example embodiment of a method for post processing a table entry;

FIG. 14 is a diagram showing an example of an encoded data representation for the values of the TS and TP fields of a virtual circuit table entry or a schedule table entry;

FIG. 15 is a table showing bit rates corresponding with period field values in the encoded data representation of FIG. 14, where the Exp field value is zero;

FIG. 16 is a diagram showing the derivation of the TS rating parameter from the encoded data representation of the TS field as shown in FIG. 14;

DETAILED DESCRIPTION

Figure 1:
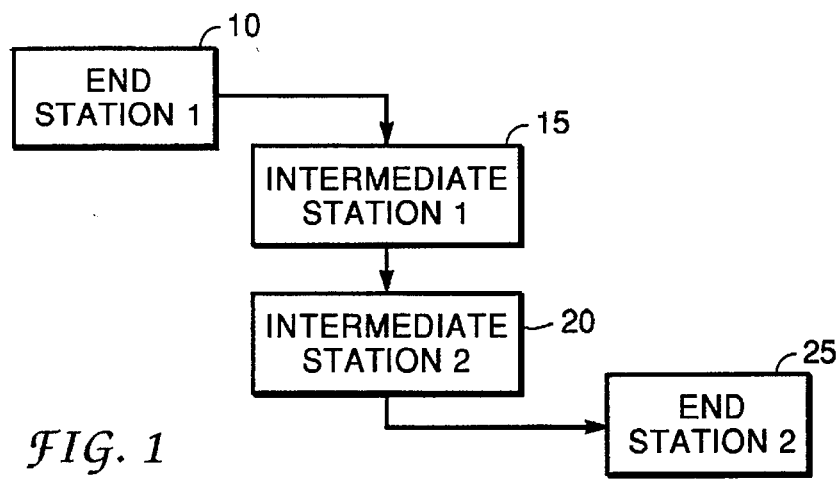
FIG. 1 is a diagram of a computer network.

FIG. 1 is a diagram of a computer network, including an End Station 1 10, Intermediate Station 1 15, Intermediate Station 2 20 and End Station 2 25. For purposes of example, End Station 1 10 is physically connected with Intermediate Station 1 15 by a transmission link supporting an Asynchronous Transfer Mode (ATM) network. Similarly, Intermediate Station 1 15 is connected with Intermediate Station 2 20, and Intermediate Station 2 20 is physically connected with End Station 2 25 by transmission links supporting ATM networking technology. Thus, the elements End Station 1 10, Intermediate Station 1 15, Intermediate Station 2 20 and End Station 2 25 form an ATM network.

During operation of the elements in FIG. 1, a user on End Station 1 10 requests that a logical connection known as a Virtual Circuit (VC) be established between End Station 1 10 and End Station 2 25. The request is made through a User Network Interface (UNI) existing between the user and the ATM network. In an example embodiment, the connection request specifies various QoS parameters of the requested connection in a connection traffic descriptor. See "Asynchronous Transfer Mode Solution for Broadband ISDN", Second Edition, by Martin De Prycker, specifically pages 289 through 307, all references of which are herein included by reference. Multiple connection requests may be issued, and multiple VCs may be established between the End Station 1 10 and the End Station 2 25.

The QoS parameters include Peak Cell Rate (PCR), Cell Delay Variation (CDV) Tolerance and Sustainable Cell Rate (SCR). The QoS parameters define the Quality of Service (QoS) negotiated for a VC when the VC is initially established. The Peak Cell Rate is the inverse of the minimum time between the initiation of any two Cell transmissions on the connection. The Peak Cell Rate is a mandatory parameter and applies to ATM VCs supporting both Constant Bit Rate (CBR) and Variable Bit Rate (VBR) services.

For ATM connections that support VBR services, the Peak Cell Rate defines an upper bound of the cell rate of the connection. In order to allow the network to allocate resources more efficiently, an additional parameter known as the Sustainable Cell Rate may be provided in the connection request. The Sustainable Cell Rate is an upper bound on the realized average cell transmission rate over the connection. To provide an advantage in resource allocation within the network, the Sustainable Cell Rate must be defined as lower than the Peak Cell Rate of the VC. For CBR connections, the user provides no Sustainable Cell Rate.

The user further supplies a Cell Delay Variation (CDV) tolerance parameter in the connection request. When cells from 2 or more ATM VCs are multiplexed, cells of a given ATM VC may be delayed while cells for another VC are being transmitted. For example, when two cells are scheduled to be transmitted at the same time over the same transmission link, then the cell which is transmitted last will suffer delay as a result. Further, scheduled cell transmissions may be delayed by the transmission of Operation And Maintenance (OAM) cells. Transmission of an OAM cell may delay the transmission of a user cell scheduled to be transmitted at the same time. Moreover, the burst tolerance for a connection, equal to the maximum number of cells that may be sent in a peak rate burst, will affect cell delay variation on a connection. The performance of Customer EQuipments (CEQs) may also introduce delay in the transmission of user cells. The user specifies in the connection request the degree of distortion allowed in the inter-arrival time of cells on the requested connection in a CDV tolerance parameter.

The network responds to the connection request issued by the user on End Station 1 10 by either creating the requested VC, or denying the request. In determining whether a requested VC can be established between End Station 1 10 and End Station 2 25, the network determines whether there are sufficient resources (for example transmission bandwidth and buffers) across the network from source to destination, for example in Intermediate Station 1 15, Intermediate Station 2 20, and end station 2 25, to allow the requested VC to be set up with the requested QoS parameters, while not impacting the QoS of already established VCs. If there are not sufficient resources to do so, the connection request is rejected, and the user on End Station 1 10 may repeat the request with lower QoS parameters.

Continuing with reference to the elements of FIG. 1, once a given VC is established between End Station 1 10 and End Station 2 25, the network applies mechanisms to ensure that the End Station 1 does not exceed its negotiated QoS parameters for that VC. For example, during operation, the transmission of cells from End Station 1 and End Station 2 is controlled such that cell transmissions are not scheduled at a rate exceeding the Peak Cell Rate, and such that the average cell rate over some predetermined period of time does not exceed the Sustainable Cell Rate of the VC.

In FIG. 1, the VC between End Station 1 10 and End Station 2 25 traverses both Intermediate Node 1 15 and Intermediate Station 2 20. The cell transmission rate over the given VC on the transmission link between End Station 1 10 and Intermediate Station 1 15, as well as the cell transmission rate over the VC on the transmission link between Intermediate Station 1 15 and Intermediate Station 2 20, and the cell transmission rate over the VC on the transmission link between Intermediate Station 2 20 and End Station 2 25 are all controlled such that they do not exceed the negotiated QoS parameters in the connection request issued to the network by the user on End Station 1 10.

Figure 2:
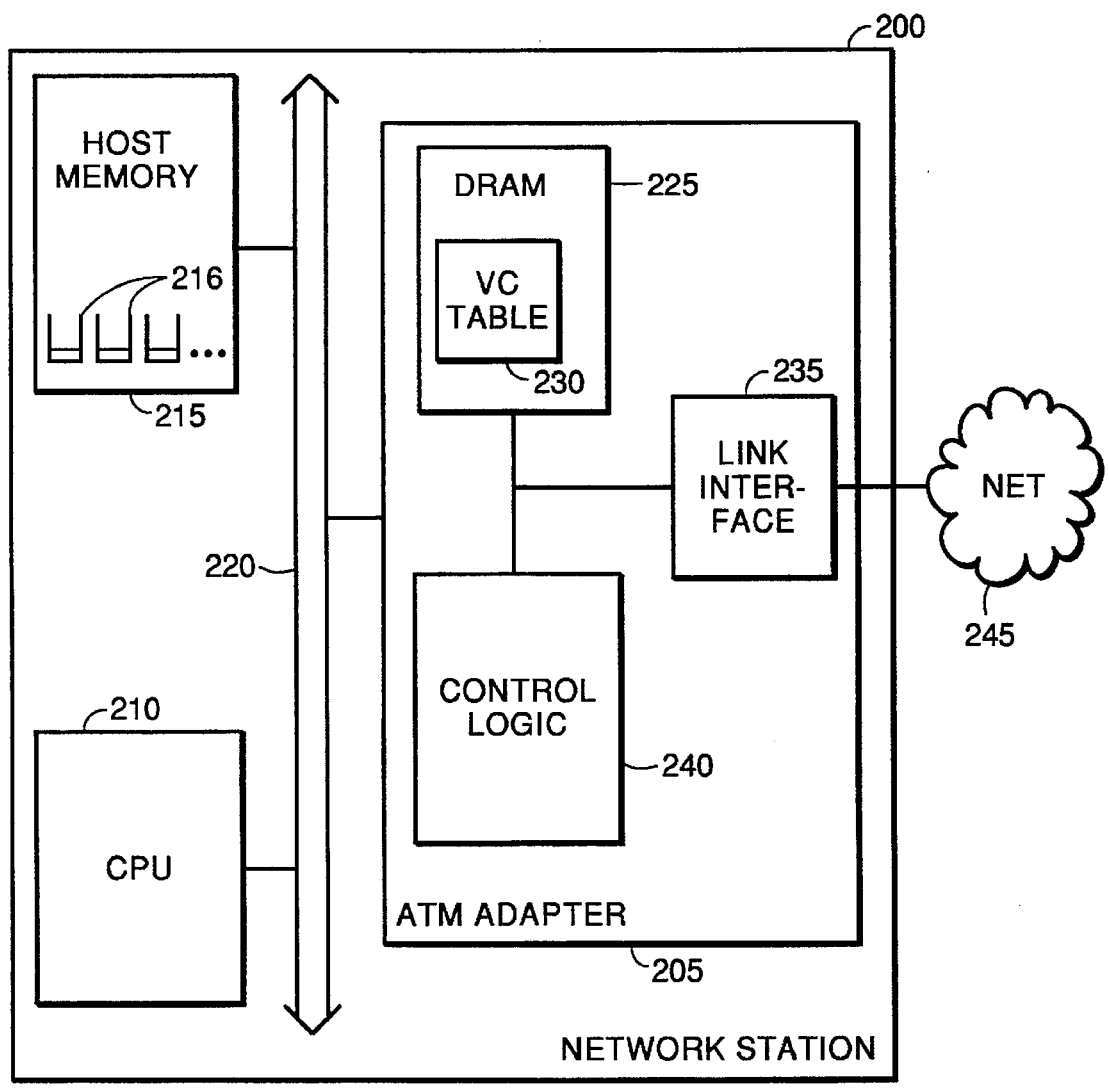
FIG. 2 is a diagram of a station on a computer network, including a network adapter.

FIG. 2 is a diagram of a Station 200 coupled with a Communications Network 245. The Station 200 shown in FIG. 2 is an example embodiment of any one of End Station 1, End Station 2, Intermediate Station 1 or Intermediate Station 2 as shown in FIG. 1. The Station 200 includes a Network Adapter 205 coupled with a bus 220, a CPU coupled with the bus 220, and a Host Memory 215 also coupled with the bus 220. The Host Memory 215 is shown having a plurality of Transmit Queues 216. Each Transmit Queue 216 contains one or more entries. The entries within the Transmit Queues 216 represent packets to be transmitted onto the Communications Network 245. A packet may be represented by one or more entries in the Transmit Queues 216. The next packet to be transmitted from a given one of the Transmit Queues 216 is said to be at the "head" of that Transmit Queue. For purposes of example, the Network Adapter 205 is an ATM network adapter, and the Communications Network 245 is an ATM network.

The Network Adapter 205 is shown having a Dynamic Random Access Memory (DRAM) 225, including a Virtual Circuit Table 230. The Virtual Circuit Table 230 includes an entry for each potential VC linking Station 200 with other stations on the Communications Network 245. The DRAM 225 is coupled with a Link Interface 235 and a Control Logic 240. The Link Interface 235 is coupled with the Communications Network 245.

During operation of the elements shown in FIG. 2, one or more virtual circuits are established by a user of the Station 200. As each VC is established, an entry in the Virtual Circuit Table 230 is initialized for the new VC. The entry is initialized with the negotiated QoS parameters for the new VC. The Control Logic 240 is responsible for controlling the Link Interface 235 such that cells to be transmitted or received between the Communications Network 245 and the Host Memory 215 are correctly processed. The Control Logic 240 is responsible for performing traffic shaping, such that the transmissions on any given VC of the Station 200 do not exceed the agreed upon QoS parameters for that VC. The QoS parameters for a given VC are accessed by the Control Logic 240 in the entry corresponding to that VC in Virtual Circuit Table 230. For example, the QoS parameters for VC are contained in Virtual Circuit Table 230 entry 1, the Qos parameters for VC2 are contained in the Virtual Circuit Table 230 entry 2, etc. In this way, the control logic multiplexes cell transmissions for multiple VCs over the link interface 235.

Figure 3:
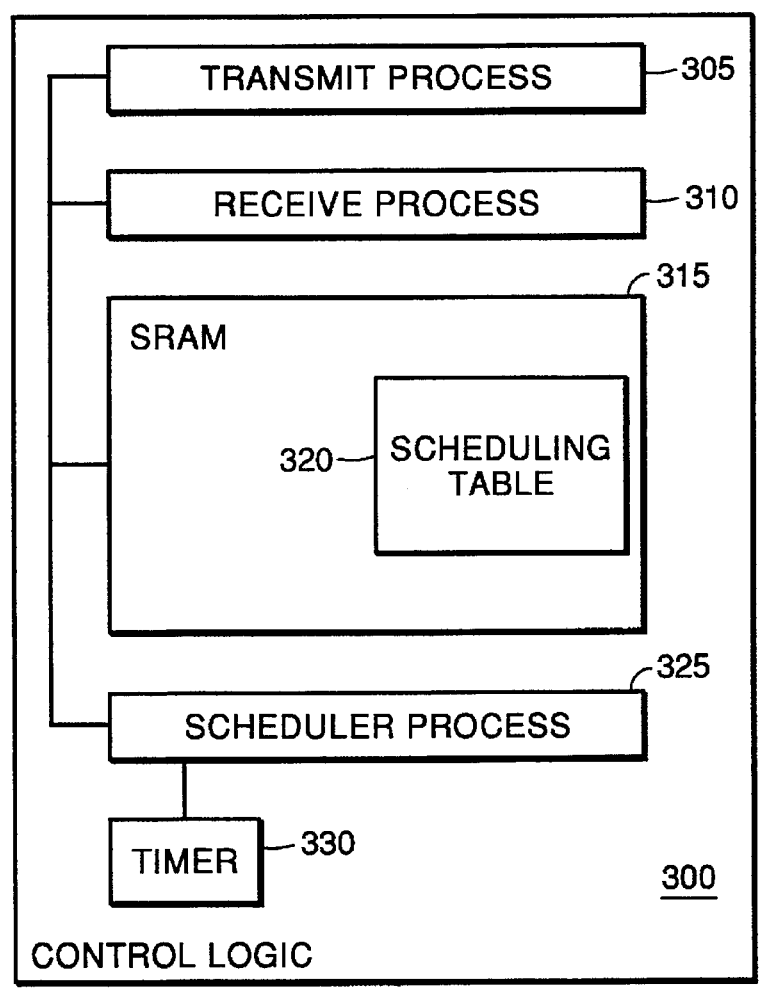
FIG. 3 is a diagram of an example embodiment of a control logic within a network adapter.

FIG. 3 shows a Control Logic 300 within a network adapter. The Control Logic 300 in FIG. 3 is an example embodiment of the Control Logic 240 shown in FIG. 2. In a first embodiment the Control Logic 300 in FIG. 3 is an Application Specific Integrated Circuit (ASIC). In an alternative embodiment the Control Logic 300 is a set of discreet logic devices. In another alternative embodiment the Control Logic 300 is one or more processes executing on a microprocessor running in the network adapter.

The Control Logic 300 in FIG. 3 is shown having a Transmit Process 305, a Receive Process 310, a Static Random Access Memory (SRAM) 315, a Scheduler Process (Scheduler) 325, and a Timer 330. The Transmit Process 305, Receive Process 310, SRAM 315, and Timer 330 are all coupled with the Scheduler Process 325.

The SRAM 315 is shown having a Scheduling Table 320. The Scheduling Table 320 consists of entries, each entry corresponding with one of the Transmit Queues 216 as shown in FIG. 2. For example Scheduling Table 320 entry 1 corresponds with Transmit Queue 1 of Transmit Queues 216, Scheduling Table 320 entry 2 corresponds with Transmit Queue 2 of Transmit Queues 216 etc. Each entry in the Scheduling Table contains information regarding the characteristics of the Virtual Circuit over which there is currently a transmission on the corresponding Transmit Queue.

The Scheduling Table 320 contains a number of entries equal to some subset of the total number of potential VCs to which the network station may be connected. The Scheduling Table 320 is advantageously smaller than the Virtual Circuit Table 230 in DRAM 225 shown in FIG. 2, since the total number of VCs which potentially can be opened with a station is very large, resulting in a very large Virtual Circuit Table 230. In the example embodiment where Control Logic 300 is implemented as an ASIC, such a large table as Virtual Circuit Table 230 would be prohibitively expensive to include in the SRAM 315 within the Control Logic 300 in terms of total number of logic gates.

During operation of the elements shown in FIG. 3, the Scheduler Process 325 detects when a new packet reaches the head of one of the Transmit Queues 216 in FIG. 2. The Scheduler Process 325 then determines which VC the new packet is to be transmitted on. The entry at the head of the transmit queue contains an index into the Virtual Circuit Table 230, thus indicating the VC on which the new packet is to be transmitted on. The Scheduler Process 325 thus determines the VC on which the new packet is to be transmitted on by reading the entry at the head of one of the Transmit Queues 216. In an alternative embodiment, the Virtual Circuit on which the new packet or cell is to be transmitted is indicated within the packet or cell data itself.

The Scheduler Process 325 next reads the QoS parameters from the indexed entry in the Virtual Circuit Table 230, and writes the QoS parameters into the entry in the Scheduling Table 320 corresponding with one of the Transmit Queues 216 having a new packet for transmission. In the example embodiment, each entry in the Scheduling Table 320 contains the QoS parameters for one VC. The Scheduler Process 325 further writes indication of the indexed entry in the Virtual Circuit Table 230 into the entry in the Scheduling Table 320, and marks the entry in the Scheduling Table 320 as valid if it was previously invalid. When the transmission of the new packet has been completed or terminated the Scheduler marks the entry as invalid. Thus the Scheduler Process 325 provides that each valid entry in the Scheduling Table 320 indicates a Virtual Circuit for which there is a packet pending transmission or currently being transmitted.

In an alternative embodiment, indication of the status of the packet or cell indicated by the queue entry at the head of a given transmit queue is stored in a Transmit Control Array Entry (TCA Entry) associated with each transmit queue. A further description of an example embodiment of a TCA Entry is provided below.

Further during operation of the elements shown in FIG. 3, the Scheduler Process 325, responsive to the timer 330, periodically scans the Scheduling Table 320 to determine which of the entries in the Scheduling Table 320 indicate a VC for which a cell may be transmitted without violating the QoS parameters for that VC. In addition, the Scheduler Process 325, responsive to the timer 330, periodically selects one of those VCs which may transmit a cell without violating its QoS parameters, to transmit a cell onto the Communications Network 245 as shown in FIG. 2.

FIRST EXAMPLE EMBODIMENT

Figure 4:
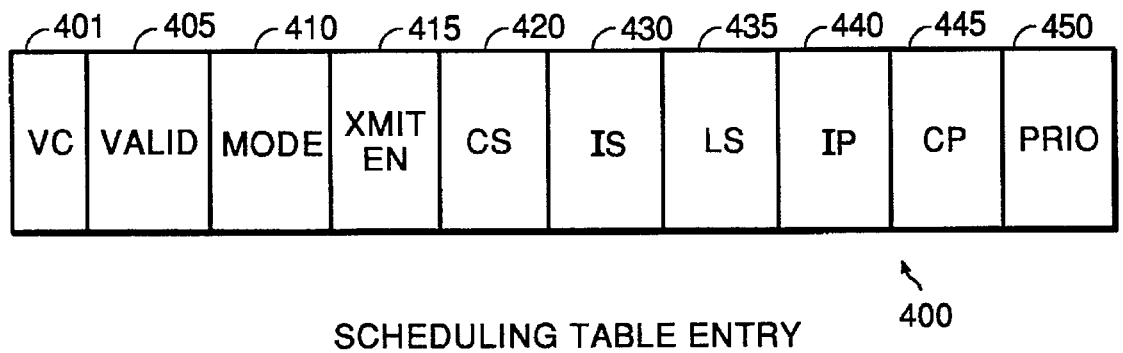
FIG. 4 is a diagram of a first example embodiment of a scheduling table entry.

FIG. 4 is a diagram of a Scheduling Table Entry 400. The Scheduling Table Entry 400 is a first example embodiment of the format of entries in Scheduling Table 320 shown in FIG. 3. The fields in the Scheduling Table 320 are written and maintained by the Scheduler Process 325 as shown in FIG. 300.

The Scheduling Table Entry 400 includes a VC field 401. The VC field 401 indicates a VC, for example by having a value equal to an index into the Virtual Circuit Table 230 as shown in FIG. 2. The VC field is written when the Scheduler detects that a new packet ready for transmission is at the head of the Transmit Queue corresponding to the Scheduling Table Entry 400. The Scheduler writes a value equal to the index of the entry in the virtual Circuit Table corresponding to the VC on which the new packet is to be transmitted into the VC field 401.

The Scheduling Table Entry 400 further includes a Valid bit 405. When the Valid bit 405 is set, the VC field 401 indicates a VC that is open and on which there is a cell ready to be transmitted. For example, where each packet consists of one or more cells, the Valid bit remains set until all cells are transmitted for that packet. The Valid bit 405 is written when the Scheduler detects that a new packet ready for transmission is at the head of the Transmit Queue corresponding to the Scheduling Table Entry 400, and cleared when the last cell for that packet is transmitted.

In an alternative embodiment, indication of the status of the packet or cell indicated by the queue entry at the head of a given transmit queue is stored in a Transmit Control Array Entry (TCA Entry) associated with each transmit queue. A further description of an example embodiment of a TCA Entry is provided below.

Scheduling Table Entry 400 also includes a Mode bit 410. The Mode bit 410 reflects which QoS rating mode has been selected for the VC corresponding with the Scheduling Table Entry 400. In the example embodiment of FIG. 4, if the Mode bit 410 is clear then both Sustainable Cell Rate and Peak Cell Rate have been selected by the user of a given Virtual Circuit indicated by the VC field 401. If the Mode bit 410 is set then only Peak Cell Rate has been selected.

Scheduling Table Entry 400 also includes a Transmit Enable (XMIT_EN) bit 415. During operation, the Scheduler Process 325 as shown in FIG. 3 sets this bit when it determines that a cell may be transmitted on the VC indicated by the VC field 401 without violating the QoS parameters for that VC, and clears this bit when a cell is transmitted on the VC indicated by the VC field 401.

Scheduling Table Entry 400 also includes a Sustainable Rate Accumulator (CS) field 420. This field is used to accumulate periodic increments reflecting the Sustainable Cell Rate for the VC indicated by VC field 401. During operation, the Scheduler Process 325 as shown in FIG. 3 initializes the CS field 420 when the Scheduler detects that a new packet ready for transmission is at the head of the Transmit Queue corresponding to the Scheduling Table Entry 400. The initial value of the CS field 420 is determined by the Scheduler responsive to QoS parameters in the Virtual Circuit Table entry for the VC on which the new packet is to be transmitted.

Further during operation, the Scheduler subtracts 1 (one) from the CS field 420 after a cell is transmitted on the VC indicated by the VC field 401. When the Valid bit 405 is set, the Scheduler Process 325 periodically increments the CS field 420 by a predetermined increment value (for example, the value of the IS field) responsive to the Timer 330 as shown in FIG. 3. When the value of the CS field 420 reaches 1, a cell may be transmitted on the VC indicated by VC field 401 without exceeding the Sustainable Cell Rate QoS parameter for that VC.

Also shown in Scheduling Table Entry 400 is a Sustainable Cell Rate Increment (IS) field 430. The value of the IS field 430 is written by the Scheduler Process 325 when the Scheduler detects that a new packet ready for transmission is at the head of the Transmit Queue corresponding to the Scheduling Table Entry 400. The value of the IS field 430 is written by the Scheduler, responsive to the QoS parameters in the Virtual Circuit Table entry for the VC on which the new packet is to be transmitted, with the number of cells (generally less than 1) that may be transmitted during one cell time without exceeding the Sustainable Cell Rate for that VC.

Further during operation, the value of the IS field 430 is periodically added by the Scheduler to the value of the CS field 420, responsive to the Timer 330, when the Valid bit 405 is set. In the example embodiment of FIG. 4, the value of the IS field 430 is stored in terms of cell transmission time, and is greater than 0 and less than 1. For example, where the Sustainable Cell Rate for a given VC is 10,000 cells per second, and cell time for the network is 40 * $10^{-7}$ seconds (250,000 cells per second), then the IS value for that VC would be $\frac{1}{25}$, equivalent to $\frac{1}{25}$th of the capacity of the link.

Scheduling Table Entry 400 also includes a Sustainable Token Limit (LS) field 435. The value of the LS field 435 is derived from the QoS parameters in the entry in the Virtual Circuit Table 230 indicated by the VC field 401. The value of the LS field 435 reflects the number of cells that may be consecutively transmitted at Peak Cell Rate for the VC indicated by the VC field 401, and controls the maximum burst duration for that VC. Larger LS field values result in proportionally larger maximum burst sizes. The value of the LS field 435 is written by the Scheduler Process 325 when the Scheduler detects that a new packet ready for transmission is at the head of the Transmit Queue corresponding to the Scheduling Table Entry 400. During operation of the elements in FIG. 4, when the Valid bit 405 is set, if the Scheduler determines that the value of CS field 420 exceeds the value of the LS field 435, the Scheduler writes the value of the LS field 435 into the CS field 420, in order to limit burst size. The value of the LS field 435 is generally greater than or equal to one.

The Scheduling Table Entry 400 also includes a Peak Cell Rate Increment (IP) field 440. The value of the IP field 440 is written when the Scheduler detects that a new packet ready for transmission is at the head of the Transmit Queue corresponding to the Scheduling Table Entry 400. The value of the IP field 440 is derived from the QoS parameters in the Virtual Circuit Table 230 entry of the VC on which the new packet is to be transmitted. The value of the IP field 440 is the number of cells which can be transmitted each cell time without exceeding the Peak Cell Rate for that VC. In the example embodiment of FIG. 4, the value of the IP field 440 is stored in terms of cell transmission time, and is greater than 0 and less than 1. Further during operation of the elements in FIG. 4, when the Valid bit 405 is set, the Scheduler periodically adds the value from the IP field 440 into the CP field 445 responsive to the Timer 330 as shown in FIG. 3.

The Scheduling Table Entry 400 of FIG. 4 is also shown including a Peak Cell Rate Accumulator (CP) field 445. The Scheduler Process 325 initializes the value of the CP field 445 when the Scheduler detects that a new packet ready for transmission is at the head of the Transmit Queue corresponding to the Scheduling Table Entry 400. The initial value of the CP field 445 is based on the QoS parameters in the Virtual Circuit Table entry for the VC on which the new packet is to be transmitted.

Further during operation, the Scheduler decrements the value of the CS field 420 by 1 (one) after a cell is transmitted on the VC indicated by the VC field 401. Also during operation of the elements shown in FIG. 4, when the Valid bit 401 is set, the Scheduler periodically adds the value from the IP field 440 into the value of the CP field 445, responsive to the Timer 330 as shown in FIG. 3. When the value of the CP field 445 is equal to or greater than 1, a cell may be transmitted on the VC indicated by the VC field 401 without exceeding the Peak Cell Rate for that VC.

A Host Assigned Priority field (PRIO) 450 is also included in the Scheduling Table Entry 400. The value of this field is used to distinguish between CBR and VBR traffic, and to accommodate for the required CDV tolerance for the VC corresponding to the Scheduling Table Entry 400. For example, when a user requests a CBR connection, the resulting VC is given a higher priority than other connections over the shared transmission link which only require VBR. During operation of the elements shown in FIG. 4, if the Scheduler determines that cells can be transmitted on more than one VC without exceeding any QoS limitations, then the Scheduler selects a VC having the highest Priority field 450 value for the next cell transmission.

Figure 5:
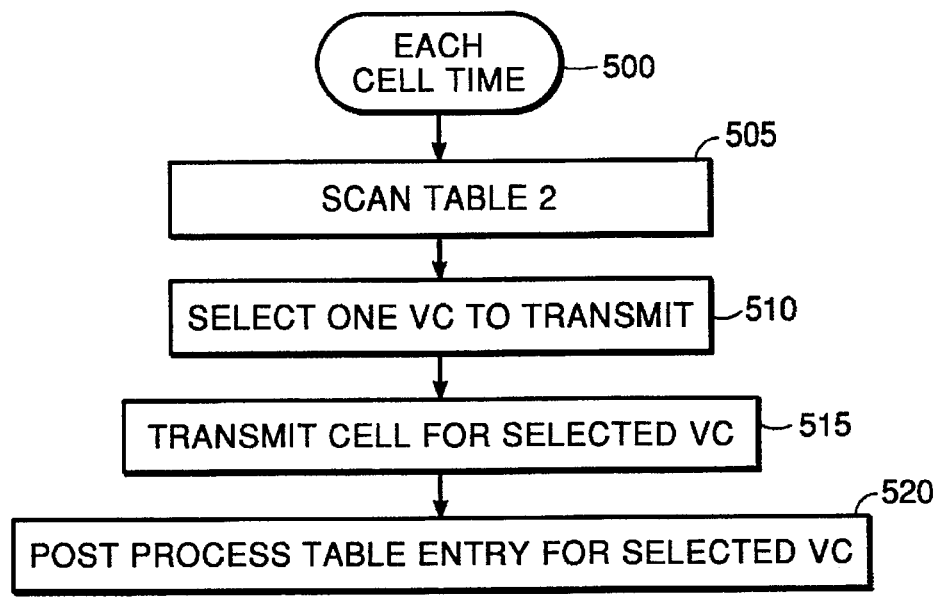
FIG. 5 is a diagram of an example embodiment of the steps of a method for scheduling cell transmissions.

FIG. 5 is a diagram of the steps of a method for scheduling cell transmissions. The steps of the method in FIG. 5 are an example embodiment of the Scheduler Process 325 in FIG. 3. The steps of FIG. 5 are performed on a table, each entry in the table including QoS parameters for one VC. In the example embodiment, the table corresponds with Scheduling Table 320 as shown in FIG. 3. However, in an alternative embodiment, the steps of FIG. 5, 6, 7 and 8 are applied directly to the entries in the Virtual Circuit Table 230 as shown in FIG. 2.

For purposes of example, each of steps 505, 510, 515 and 520 are embodied as processes in an ASIC. In an alternative embodiment, each of steps 505, 510, 515 and 520 are processes executing on a microprocessor within the ATM adapter 205 as shown in FIG. 2.

The steps of the method shown in FIG. 5 are triggered by a trigger event 500 occurring each cell time, where a cell time is the time required to transmit one fixed length transmission cell onto the communications network. For purposes of example, the trigger event 500 is caused by the expiration of a timer (for example Timer 330 as shown in FIG. 3) having a period equal to one cell time.

Following the trigger event 500, in step 505, the Scheduler scans the table. In step 505 the Scheduler determines which entries indicate VCs on which a cell may be transmitted without exceeding the QoS parameters for that VC. Each such entry is marked by the Scheduler as ready to transmit, for example by setting a Transmit Enable bit in each entry.

Following step 505, in step 510, the Scheduler selects one of the entries marked as ready to transmit. Those entries in the table that are marked as ready to transmit but are not selected in step 510 remain marked as ready to transmit. When the Scheduler next scans the table, entries that remain marked as ready to transmit continue to indicate VCs on which a cell may be transmitted without exceeding the QoS parameters for that VC.

After step 510, in step 515, the Scheduler uses the link interface logic (as shown as 235 in FIG. 1) to transmit a cell on the VC corresponding with the table entry selected in step 510. Following the transmission of the cell in step 515, the scheduler post-processes the selected table entry in step 520.

Figure 6:
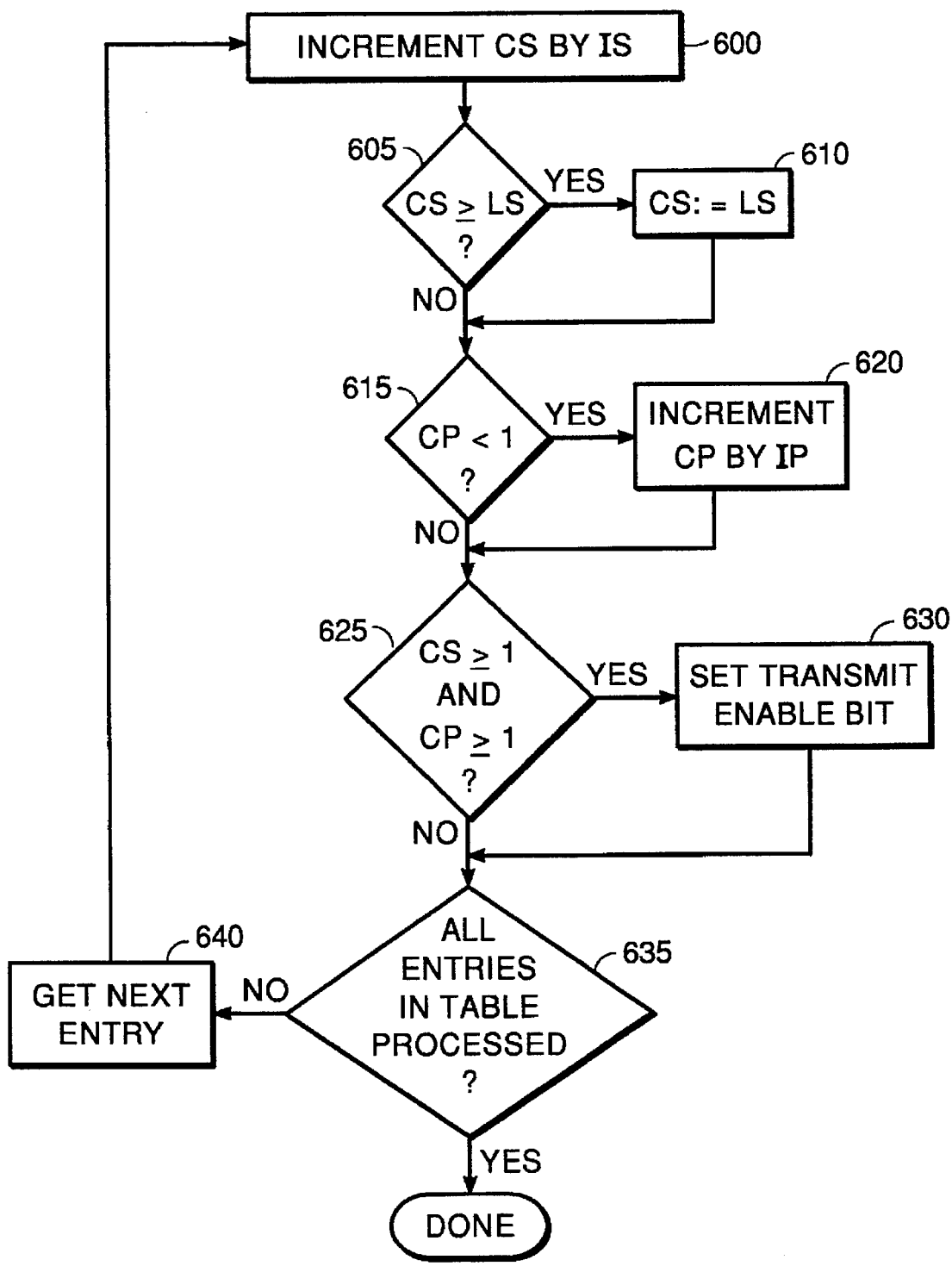
FIG. 6 is a diagram showing the steps of a first example embodiment of a method for scanning table entries.

FIG. 6 is a diagram of the steps of a first example embodiment of a method for scanning table entries. In the example embodiment of FIG. 6, the steps of FIG. 6 are performed by the Scanning Process corresponding to step 505 in FIG. 5 and contained within the Scheduler Process 325 as shown in FIG. 3. In the example embodiment, each of the steps 600, 605, 610, 615, 620, 625, 630, 635 and 640 are implemented as processes within an ASIC. In the example embodiment, the elements of FIG. 6 operate on the Scheduling Table 320 as shown in FIG. 3. Further in the example embodiment of FIG. 6, the format of the table entries corresponds with the format shown in FIG. 4.

During step 600 in FIG. 6, the Scheduler increments the CS field value for the current entry by the value of the IS field for that entry. Following step 600, in step 605, the Scheduler compares the incremented value of the CS field with the value of the LS field for that entry. If the Scheduler determines in step 605 that the CS field value is greater then or equal to the value of the LS field, then Step 610 is performed following step 605. If the scheduler determines in step 605 that the CS field value is not greater than or equal to the value of the LS field, step 610 is skipped, and the Scheduler continues with step 615 following step 605. In step 610, the scheduler sets the value of CS field to the value of the LS field. Following step 610, step 615 is performed.

In step 615, the Scheduler compares the incremented value of the CP field with 1. If the Scheduler determines in step 615 that the value of the CP field is less than 1, then step 620 is performed following step 615. Otherwise, if the Scheduler determines that the value of the CP field is not less than 1, then step 620 is skipped and step 625 is performed following step 615. In step 620, the Scheduler adds the value of IP to the value of the CP field. Step 620 is followed by step 625.

In step 625, the Scheduler compares the values of CS field and CP field with 1. If the Scheduler determines that the values of the CS field and CP field are both equal to or greater than 1, then step 630 performed following step 625. Otherwise, if the Scheduler determines in step 625 that the values of the CS field and CP field are not both equal to or greater than 1, then step 630 is skipped, and step 625 is followed by step 635. In step 630, the Scheduler sets the transmit enable bit in the entry.

In step 635, the Scheduler determines whether all the entries in the table have been scanned. If the Scheduler determines that not all the entries in the table have been scanned, then step 640 follows step 635. Otherwise, if the Scheduler determines that all entries in the table have been scanned, then the Scheduler has completed scanning the table. In step 640, the Scheduler selects the next entry in the table for scanning. Following step 640, the Scheduler continues on with step 600, repeating steps 600, 605, 610, 615, 620, 625, 630, 635 and 640 until all the entries in the table have been scanned.

Figure 7:
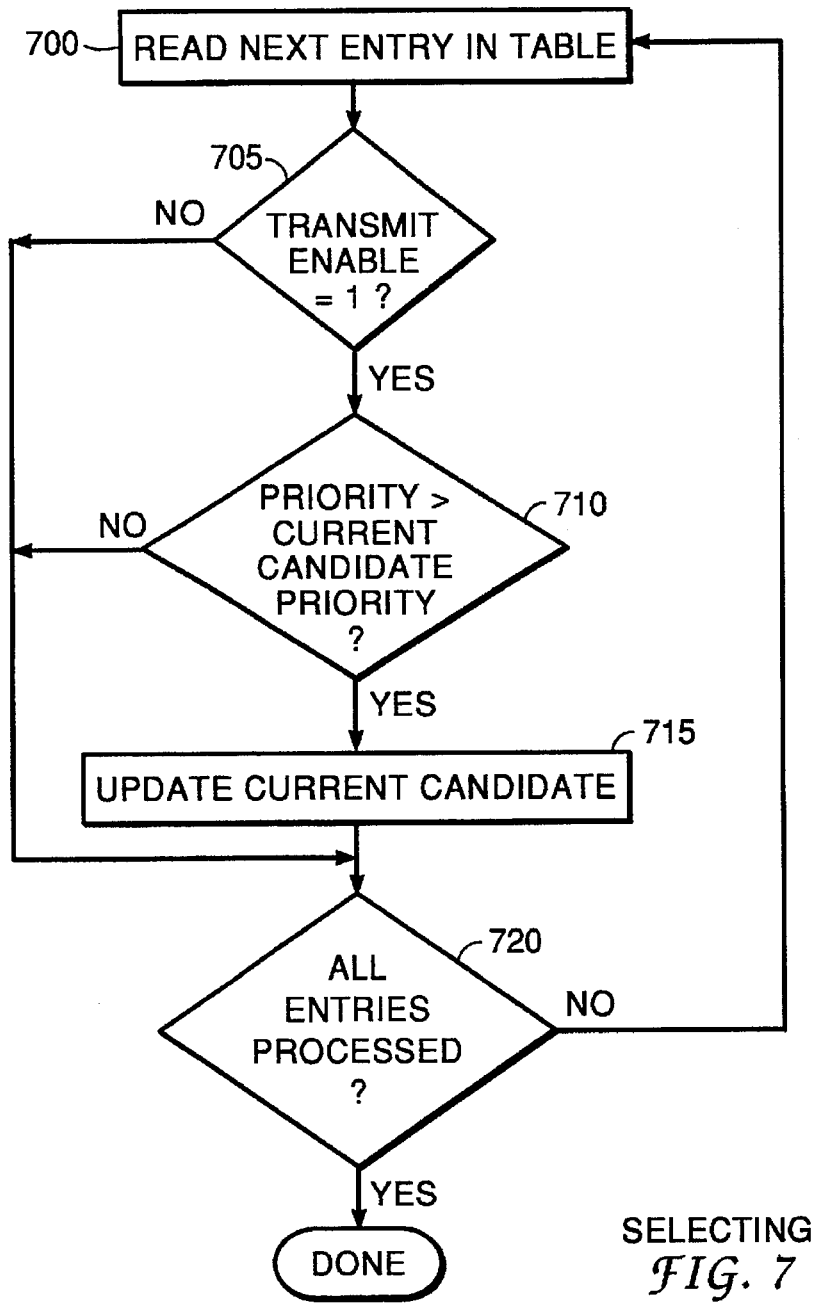
FIG. 7 is a diagram showing the steps of a first example embodiment of a method for selecting a table entry for transmission.

FIG. 7 is a diagram of the steps of a first example embodiment of a method for selecting a table entry for transmission. In the example embodiment, the elements of FIG. 7 operate on the Scheduling Table 320 as shown in FIG. 3. Further in the example embodiment of FIG. 7, the format of the table entries corresponds with the format shown in FIG. 4.

The steps shown in FIG. 7 are performed by the process corresponding with step 510 in FIG. 5, which is contained within the Scheduler Process 325 as shown in FIG. 3. The steps shown in FIG. 7 select one table entry from those entries which the Scheduler has determined indicate a VC on which a cell may be transmitted without exceeding the QoS parameters for that VC.

In step 700 of FIG. 7, the Scheduler reads the next entry in the table. The next entry read in step 700 is referred to herein as the current entry. Following step 700, in step 705 the Scheduler determines whether the transmit enable (XMIT_EN) bit in the current entry is set. If the Scheduler determines in step 705 that the transmit enable bit in the current entry is set, then step 705 is followed by step 710. If the Scheduler determines in step 705 that the transmit enable bit in the current entry is not set, then step 705 is followed by step 720.

In step 710, the Scheduler determines whether the value of the priority field in the current entry is greater than the value of a priority field in a current candidate register. The current candidate register is used by the Scheduler during the selecting step 510 as shown in FIG. 5 to store an entry indicating a VC that may transmit a cell, and also having the highest priority field value of any other VC that may transmit a cell. If the Scheduler determines in step 710 that the value of the priority field value of the current entry is greater than the priority field value in the current candidate register, then step 710 is followed by step 715. If the Scheduler determines in step 710 that the value of the priority field in the current entry is not greater than the value of the priority field in the current candidate register, then step 710 is followed by step 720.

In step 715, the Scheduler updates the current candidate register by writing the value of the current entry into the current candidate register. Thus the current candidate register is maintained during the selection process as that entry in the table having the highest priority field value of an entry corresponding with a VC on which a cell may be transmitted without exceeding the QoS parameters for that VC. Step 715 is followed by step 720.

In step 720, the Scheduler determines whether all entries in the table have been processed by the selecting step 510 as shown in FIG. 5. If in step 720 the Scheduler determines that all entries in the table have been so processed, then the selecting step 510 as shown in FIG. 5 is completed. If the Scheduler determines that not all entries in the table have been so processed, then step 720 is followed by step 700, a new entry is read as the current entry, and the process continues until all entries in the table have been processed.

Following completion of the steps shown in FIG. 7, the Scheduler transmits a cell on the VC indicated by the entry stored in the current candidate register, as described by step 515 in FIG. 5. The selected table entry is thus contained in the current candidate register following the completion of the steps shown in FIG. 7.

Figure 8:
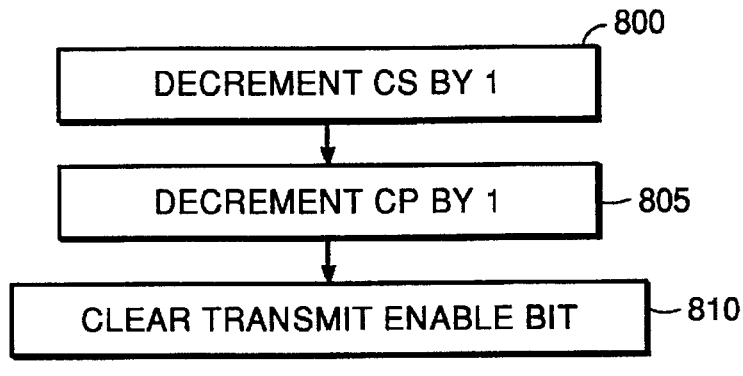
FIG. 8 is a diagram showing the steps of a first example embodiment of a method for post processing a selected table entry.

FIG. 8 is a diagram of a first example embodiment of the steps of a method for post processing a selected table entry. The steps in FIG. 8 are performed by the process 520 as shown in FIG. 5, which is part of the Scheduler process 325 as shown in FIG. 3. In the example embodiment, the elements of FIG. 8 operate on the Scheduling Table 320 as shown in FIG. 3. Further in the example embodiment of FIG. 8, the format of the table entries corresponds with the format shown in FIG. 4.

The steps in FIG. 8 are performed by the Scheduler on the entry in the table which was selected by the selecting process 510 as shown in FIG. 5. The selected entry is the entry read from Scheduling Table and stored in the current candidate register by the Scheduler during the selecting process 510, and remaining in the candidate register at the end of the selecting process 510. The steps shown in FIG. 8 are performed by the Scheduler on the selected entry.

In step 800 of FIG. 8, the Scheduler decrements the value of the CS field in the selected entry by one. Following step 800, in step 805, the Scheduler decrements the CP field value in the selected entry by 1. Following step 805, the Scheduler clears the Transmit Enable bit in the selected entry. In this way the steps shown in FIG. 8 show an example of how the Scheduler Process 325 in FIG. 3 performs the step of post processing the selected table entry in step 520 as shown in FIG. 5.

SECOND EXAMPLE EMBODIMENT

Figure 9:
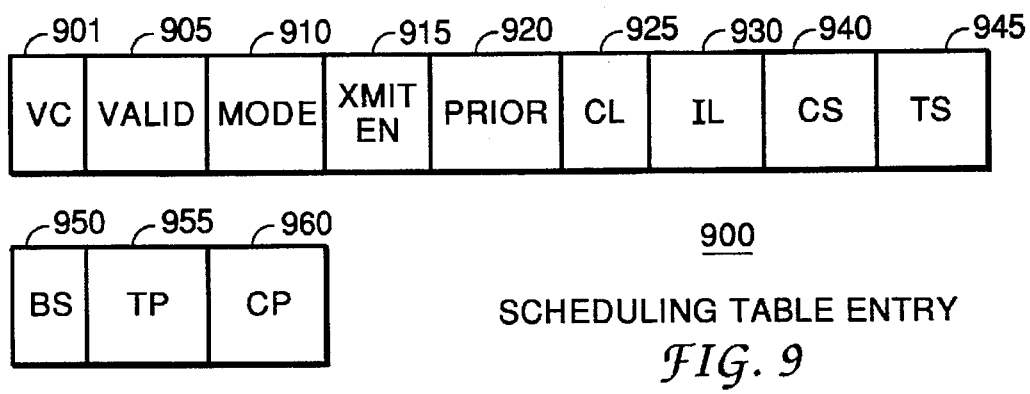
FIG. 9 is a diagram of a second example embodiment of a scheduling table entry.

FIG. 9 is a diagram of a Scheduling Table Entry 900. The Scheduling Table Entry 900 is a second example embodiment of the format of entries in Scheduling Table 320 shown in FIG. 3. The fields in the Scheduling Table are maintained by the Scheduler Process 325 as shown in FIG. 300.

The Scheduling Table Entry 900 includes a VC field 901. The VC field 901 indicates a VC, for example by having a value equal to an index into the Virtual Circuit Table 230 as shown in FIG. 2. The VC field is written when the Scheduler detects that a new packet ready for transmission is at the head of the Transmit Queue corresponding to the Scheduling Table Entry 900. The Scheduler writes a value equal to the index of the entry in the Virtual Circuit Table corresponding to the VC on which the new packet is to be transmitted.

The Scheduling Table Entry 900 further includes a Valid bit 905. When the Valid bit 905 is set, the VC field 901 indicates a VC that is open and on which there is a cell ready to be transmitted. For example, where each packet consists of one or more cells, the Valid bit 905 remains set until all cells are transmitted for that packet. The Valid bit 905 is written when the Scheduler detects that a new packet ready for transmission is at the head of the Transmit Queue corresponding to the Scheduling Table Entry 900, and cleared when the last cell for that packet is transmitted. Further, if there are successive packet transmissions for the same Virtual Circuit, then the Valid bit 905 may remain set between the transmission of the two packets. And also, if the QoS parameters for a VC change during operation, then the Scheduler may clear the valid bit for a Scheduling Table entry that is currently transmitting over that VC. Upon writing the new QoS parameters into the virtual circuit table entry and subsequently loading the corresponding scheduler table entry, the valid bit is again set.

Scheduling Table Entry 900 also includes a Mode bit 910. The Mode bit 910 reflects which QoS rating mode has been selected for the VC corresponding with the Scheduling Table Entry 900. In the example embodiment of FIG. 9, if the Mode bit 910 is clear then both Sustainable Cell Rate and Peak Cell Rate have been selected. If the Mode bit 910 is set then only Peak Cell Rate has been selected.

Scheduling Table Entry 900 also includes a Transmit Enable (XMIT_EN) bit 915. During operation, the Scheduler Process 325 as shown in FIG. 3 sets this bit when it determines that a cell may be transmitted on the VC indicated by the VC field 901 without violating the QoS parameters for that VC, and clears this bit when a cell is transmitted on the VC indicated by the VC field 901.

A Host Assigned Priority field (PRIO) 920 is also included in the Scheduling Table Entry 900. The value of this field is used to distinguish between CBR and VBR traffic, and to accommodate for the required CDV tolerance for the VC indicated by the VC field 901 of the Scheduling Table Entry 900. For example, when a user requests a CBR connection, the resulting VC is given a higher priority than other connections over the shared transmission link which only require VBR. During operation of the elements shown in FIG. 9, if the Scheduler determines that cells can be transmitted on more than one VC without exceeding any Qos limitations, then the Scheduler selects a VC having the highest priority for the next cell transmission.

The Scheduling Table Entry 900 further includes a Latency Accumulator (CL) field 925. The CL field 925 contains the total time elapsed since a cell was transmitted on the VC indicated by the VC field 901. Also shown in the Scheduling Table Entry 930 is a Latency Increment (IL) field 930. The value of the IL field 930 is written by the Scheduler Process 325 when the Scheduler detects that a new packet ready for transmission is at the head of the Transmit Queue corresponding to the Scheduling Table Entry 900. The value of IL 930 is written by the Scheduler, responsive to the QoS parameters in the Virtual Circuit Table entry for the VC on which the new packet is to be transmitted, and reflects the CDV tolerance parameter specified in the connection request issued by the user for that VC. The value of IL field 930 is periodically added by the Scheduler to the CL field 925, responsive to the Timer 330, when the Valid bit 905 is set. Generally speaking, as the value in CL field 925 increases, the priority given to that VC for subsequent transmissions is similarly increased relative to other VCs.

Scheduling Table Entry 900 also includes a Sustainable Rate Accumulator (CS) field 940. This field is used to accumulate periodic increments reflecting the Sustainable Cell Rate for the VC indicated by VC field 901. During operation of the elements in FIG. 9, the Scheduler Process 325 as shown in FIG. 3 initializes the value of the CS field 920 when the Scheduler detects that a new packet ready for transmission is at the head of the Transmit Queue corresponding to the Scheduling Table Entry 900. The initial value of the CS field is responsive to QoS parameters in the Virtual Circuit Table entry for the VC on which the new packet is to be transmitted.

Further during operation, the Scheduler subtracts the value in the TS field 945 from the value of the CS field 920 when a cell is transmitted on the VC indicated by the VC field 901. When the Valid bit 905 is set, the Scheduler Process 325 periodically increments the value of the CS field 920 by 1 responsive to the Timer 330 as shown in FIG. 3. When the value of the CS field 920 is greater than or equal to the value in the TS field 945, a cell may be transmitted on the VC indicated by VC field 901 without exceeding the Sustainable Cell Rate QoS parameter for that VC. Thus CS field 920 accumulates time as indicated by the Timer 330, and when the CS field 920 has accumulated enough time for 1 cell, then a cell may be transmitted.

Also shown in Scheduling Table Entry 400 is a Sustainable Cell Rate Period field (TS) 945. The value of the TS field 945 is written by the Scheduler Process 325 when the Scheduler detects that a new packet ready for transmission is at the head of the Transmit Queue corresponding to the Scheduling Table Entry 900. The value of the TS field 945 is written by the Scheduler, responsive to the QoS parameters in the Virtual Circuit Table entry for the VC on which the new packet is to be transmitted, with the number of clock ticks equal to the inverse of the Sustainable Cell Rate for that VC. The duration of one clock tick is the duration of Timer 330 in FIG. 3. The value of the TS field 945 is periodically compared by the Scheduler with the value of the CS field 940, responsive to the Timer 330, when the Valid bit 905 is set.

Scheduling Table Entry 900 also includes a Sustainable Token Bucket Size field (BS) 950. The value of the BS field 950 is derived from the QoS parameters in the entry in the Virtual Circuit Table 230 indicated by the VC field 901. The value of the BS field 950 reflects the Sustainable Cell Rate Bucket Size for the VC indicated by the VC field 901, and controls the maximum burst size for that VC. Larger BS field values result in proportionally larger maximum burst sizes. The value of the BS field 950 is written by the Scheduler Process 325 when the Scheduler detects that a new packet ready for transmission is at the head of the Transmit Queue corresponding to the Scheduling Table Entry 900. The initial value of the BS field 950 is responsive to the QoS parameters in the Virtual Circuit Table entry for the VC on which the new packet is to be transmitted.

Also during operation of the elements in FIG. 9, when the Valid bit 905 is set, if the Scheduler determines that the value of CS field 940 exceeds the value of the BS field 950, the Scheduler writes the value of the BS field 950 into the CS field 940.

The Scheduling Table Entry 900 also includes a Peak Cell Rate Period field (TP) 955. The value of the TP field 955 is derived from the QoS parameters in the Virtual Circuit Table 230 entry indicated by the VC field 901. The TP field 955 is written when the Scheduler detects that a new packet ready for transmission is at the head of the Transmit Queue corresponding to the Scheduling Table Entry 900. The value of the TP field 955 is the inverse of the Peak Cell Rate of the VC on which the new packet is to be transmitted. The value of the TP field 955 is given in terms of clock ticks, where the duration of one clock tick is the duration of Timer 330 in FIG. 3.

During operation of the elements in FIG. 9, when the Valid bit 905 is set, the Scheduler periodically compares the value of the TP field 955 with the value of the CP field 960 responsive to the Timer 330 as shown in FIG. 3.

The Scheduling Table Entry 900 of FIG. 9 is further shown to include a Peak Cell Rate Accumulator (CP) field 960. The Scheduler Process 325 initializes the value of the CP field 960 when the Scheduler detects that a new packet ready for transmission is at the head of the Transmit Queue corresponding to the Scheduling Table Entry 900. The initial value of the CP field 960 is based on QoS parameters in the Virtual Circuit Table entry for the VC on which the new packet is to be transmitted.

Further during operation, the Scheduler decrements the value of the CP field 960 by the value of the TP field 955 after a cell is transmitted on the VC indicated by the VC field 901. During operation of the elements shown in FIG. 9, when the Valid bit 901 is set, the Scheduler periodically compares the value from the TP field 955 with the value from the CP field 960, responsive to the Timer 330 as shown in FIG. 3. When the value of the CP field 960 is equal to or greater than the value of the TP field 955, a cell may be transmitted on the VC indicated by the VC field 901 without exceeding the Peak Cell Rate for that VC.

Figure 10:
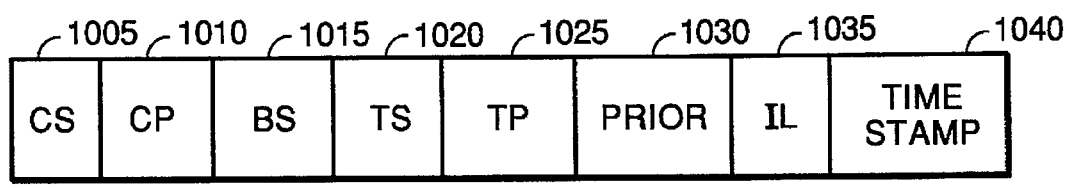
FIG. 10 is a diagram of an example embodiment of a virtual circuit table entry.

FIG. 10 is a diagram of an example embodiment of a format of a Virtual Circuit Table entry 1000 in the Virtual Circuit Table 230 as shown in FIG. 2. The format shown in FIG. 10 corresponds with the second example embodiment, as also shown by the Scheduling Table Entry 900 of FIG. 9.

The Virtual Circuit Table Entry 1000 is shown including a Sustainable Cell Rate Accumulator (CS) field 1005, a Peak Cell Rate Accumulator (CP) field 1010, a Bucket Size field (BS) 1015, a Sustainable Cell Rate Period field (TS) 1020, a Peak Cell Rate Period field (TP) 1025, a Priority (Prior) field 1030, a Latency Increment (IL) field 1035, and a Timestamp field 1040.

During operation, when the Scheduler detects that a new packet ready for transmission is at the head of a Transmit Queue, the Scheduler determines which Scheduling Table Entry corresponds with the Transmit Queue of the pending transmission. Then the Scheduler copies the values from the CS 940 and CP 960 fields from that Scheduling Table Entry into the CS 1005 and CP 1010 fields of the Virtual Circuit Table Entry 1000 indicated by the VC field 901 in that Scheduling Table entry.

Next, the Scheduler determines which VC the new packet is to be transmitted on. The Scheduler then copies the values from the CS 1005, CP 1010, BS 1015, TS 1020, TP 1025, PRIO 1030 and IL 1035 fields of the Virtual Circuit Table entry for that VC into the CS 940, CP 960, BS 950, TS 945, TP 955, PRIO 920 and IL 930 fields of the Scheduling Table entry corresponding with the transmit queue of the pending transmission. The Scheduler next subtracts the value of the Timestamp field 1040 in the Virtual Circuit Table Entry 1000 from the current time. The Scheduler then adds the result of the subtraction to the new value of the CS field 940 and the new value of the CP field 960 of the Scheduling Table entry. For purposes of example, the current time is defined as the time since the last initialization of the network station.

Figure 11:
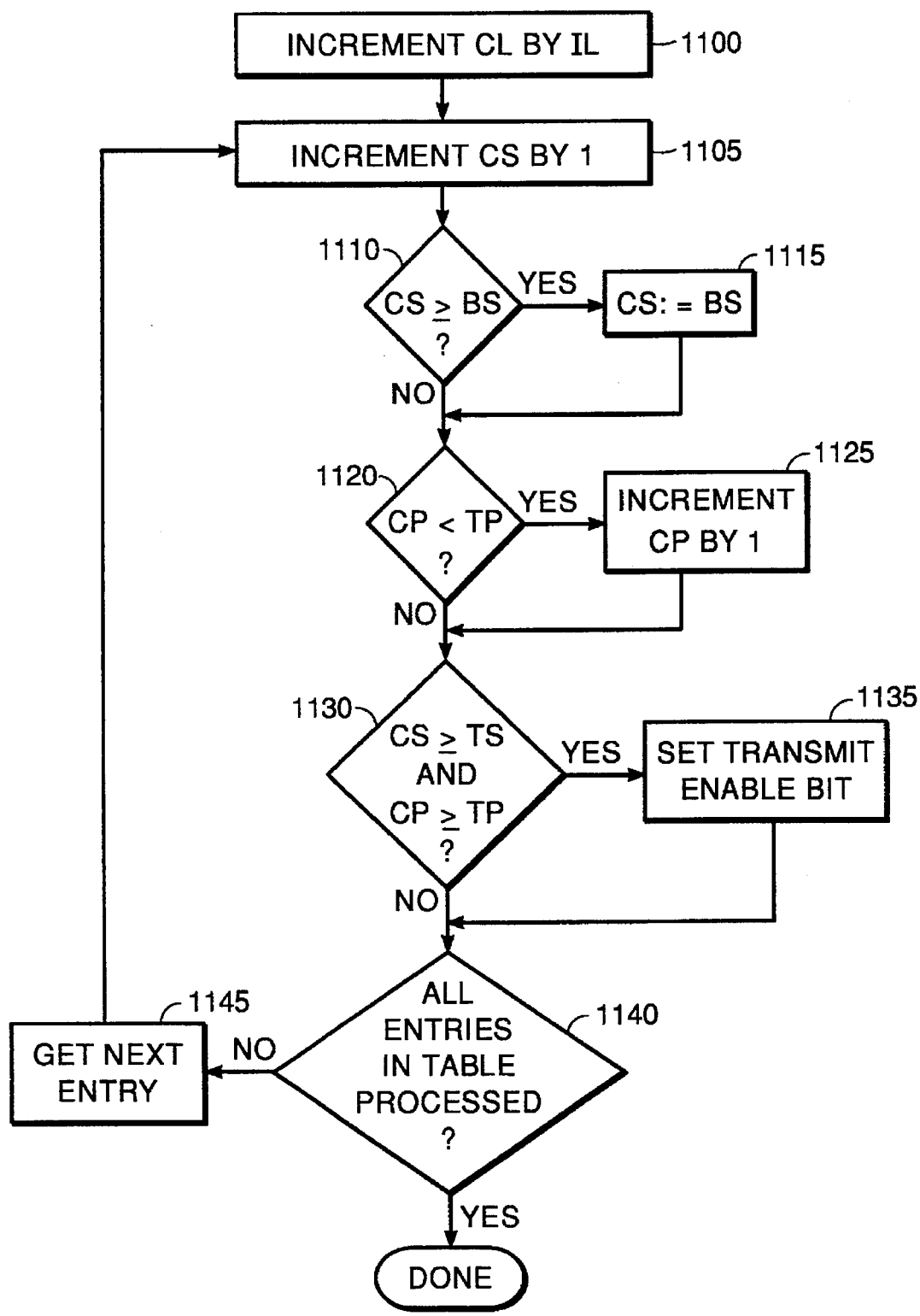
FIG. 11 is a diagram showing the steps of a second example embodiment of a method for scanning table entries.

FIG. 11 is a diagram showing the steps of a second example embodiment of a method for scanning table entries. The steps shown in FIG. 11 correspond with the second example embodiment of the Scheduling Table entry 900 as shown in FIG. 9. In the example embodiment of FIG. 11, the steps of FIG. 11 are performed by the Scanning Process corresponding to step 505 in FIG. 5 and contained within the Scheduler Process 325 as shown in FIG. 3. In the example embodiment, each of the steps 1100 through 1145 are implemented as processes within an ASIC. In the example embodiment, the elements of FIG. 11 operate on the Scheduling Table 320 as shown in FIG. 3. Further in the example embodiment of FIG. 11, the format of the table entries corresponds with the format shown in FIG. 9.

During step 1100 in FIG. 11, the Scheduler selects a current entry, and increments the CL field value of the current entry by the value of the IL field for that entry. Following step 1100, in step 1105, the Scheduler increments the value of the CS field for the current entry by 1. Following step 1105, in step 1110, the Scheduler compares the incremented value of CS field with the value of BS for that entry. If the Scheduler determines in step 1110 that the value of the CS field is greater then or equal to BS, then step 1115 is performed following step 1110. If the scheduler determines in step 1110 that the value of the CS field is not greater than or equal to BS, step 1115 is skipped, and the Scheduler continues with step 1120 following step 1110. In step 1115, the scheduler sets the value of the CS field to the value of BS. Following step 1115, step 1120 is performed.

In step 1120, the Scheduler compares the value of CP with the value of the TP field. If the Scheduler determines in step 1120 that the value of the CP field is less than the value of the TP field, then step 1120 is followed by step 1125. Otherwise, if the Scheduler determines in step 1120 that the value of the CP field is not less than the value of the TP field, then step 1120 is followed by 1130. In step 1125, the value of the CP field is incremented by 1. Step 1125 is followed by step 1130.

In step 1130, the Scheduler compares the values of the CS and CP fields with the values of the TS and TP fields respectively. If the Scheduler determines in step 1130 that the value of the CS field is greater than or equal to the value of the TS field, and that the value of the CP field is greater than or equal to the value of the TP field, then step 1130 is followed by step 1135. Otherwise, step 1130 is followed by step 1140. In step 1135, the Scheduler sets the Transmit Enable Bit. Step 1135 is followed by step 1140.

In step 1140, the Scheduler determines whether all the entries in the table have been scanned. If the Scheduler determines that not all the entries in the table have been scanned, then step 1145 follows step 1140. Otherwise, if the Scheduler determines that all entries in the table have been scanned, then the Scheduler has completed scanning the table. In step 1145, the Scheduler selects the next entry in the table for scanning. Following step 1145, the Scheduler continues on with step 1100, repeating steps 1100 through 1145 until all the entries in the table have been scanned.

Figure 12:
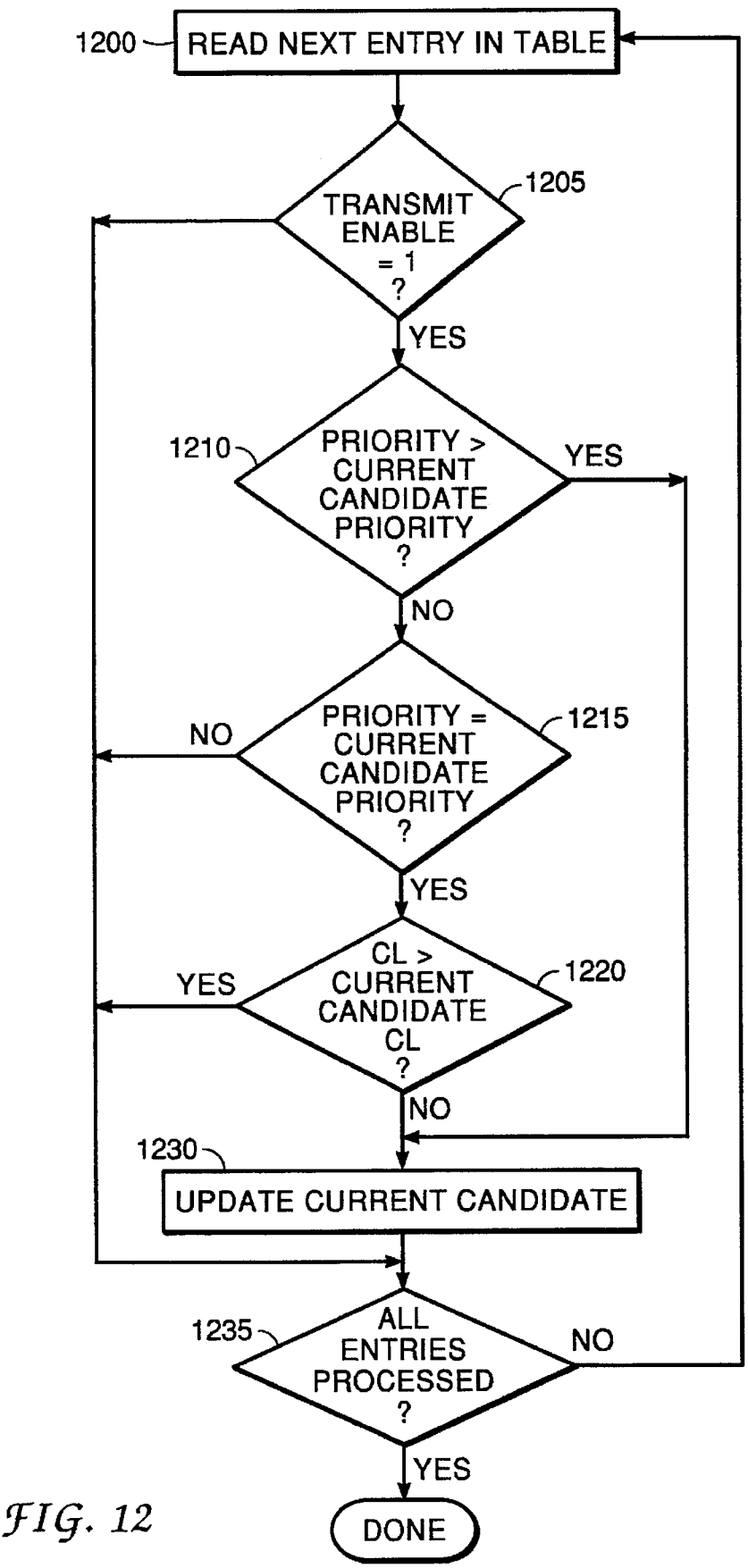
FIG. 12 is a diagram showing the steps of a second example embodiment of a method for selecting a virtual circuit for transmission.

FIG. 12 is a diagram showing the steps of a second example embodiment of a method for selecting a virtual circuit for transmission. In the example embodiment of FIG. 12, the elements of FIG. 12 operate on the Scheduling Table 320 as shown in FIG. 3. Further in the example embodiment of FIG. 7, the format of the table entries corresponds with the format shown in FIG. 9.

The steps shown in FIG. 12 are performed by the process corresponding with step 510 in FIG. 5, which is contained within the Scheduler Process 325 as shown in FIG. 3. The steps shown in FIG. 12 select one table entry from those entries which the Scheduler has determined indicate a VC on which a cell may be transmitted without exceeding the QoS parameters for that VC.

In step 1200 of FIG. 12, the Scheduler reads the next entry in the table. The next entry read in step 1200 is referred to herein as the current entry. Following step 1200, in step 1205 the Scheduler determines whether the transmit enable (XMIT_EN) bit in the current entry is set. If the Scheduler determines in step 1205 that the transmit enable bit in the current entry is set, then step 1205 is followed by step 1210. If the Scheduler determines in step 1205 that the transmit enable bit in the current entry is not set, then step 1205 is followed by step 1235.

In step 1210, the Scheduler determines whether the value of the priority field in the current entry is greater than the value of a priority field in a current candidate register. The current candidate register is used by the Scheduler during the selecting step 510 as shown in FIG. 5 to store an entry read from the table that has been found to contain the highest priority field value. The contents of the current candidate register is referred to as the current candidate.

If the Scheduler determines in step 1210 that the value of the priority field value of the current entry is greater than the priority field value in the current candidate register, then step 1210 is followed by step 1230. If the Scheduler determines in step 1210 that the value of the priority field in the current entry is not greater than the value of the priority field in the current candidate register, then step 1210 is followed by step 1215.

In step 1215, the Scheduler determines whether the priority field value of the current entry is equal to the value of the priority field value of the current candidate register. If the Scheduler determines in step 1215 that the priority field value of the current entry is equal to the value of the priority field value of the current candidate, then the step 1215 is followed by step 1220. If the Scheduler determines in step 1215 that the priority field value of the current entry is not equal to the priority field value of the current candidate register, then step 1215 is followed by step 1235.

In step 1220, the Scheduler determines whether the CL field value of the current entry is greater than the value of the CL field value of the current candidate register. If the Scheduler determines in step 1220 that the CL field value of the current entry is greater than the value of the CL field in the current candidate register, then step 1220 is followed by step 1235. If the Scheduler determines in step 1220 that the CL field value of the current entry is not greater than the CL field value of the current candidate register, then step 1220 is followed by step 1230.

In step 1230, the Scheduler updates the current candidate register by writing the value of the current entry into the current candidate register. Thus the current candidate register is maintained during the selection process as that entry in the table having the highest priority field value of an entry corresponding with a VC on which a cell may be transmitted without exceeding the QoS parameters for that VC. In the event that there are multiple entries corresponding with a VC on which a cell may be transmitted, all having equal priority, the candidate register is written with that table entry corresponding with the VC having the greatest Latency Accumulator (CL) value. The Latency Accumulator value reflects the time since a previous cell transmission on that VC. Step 1230 is followed by step 1235.

In step 1235, the Scheduler determines whether all entries in the table have been processed by the selecting step 510 as shown in FIG. 5. If in step 1235 the Scheduler determines that all entries in the table have been so processed, then the selecting step 510 as shown in FIG. 5 is completed. If the Scheduler determines that not all entries in the table have been so processed, then step 1235 is followed by step 1200, a new entry is read as the current entry, and the process continues until all entries in the table have been processed.

Following completion of the steps shown in FIG. 12, the Scheduler transmits a cell on the VC indicated by the entry stored in the current candidate register, as described by step 515 in FIG. 5. The selected table entry from the table is thus shown to be contained in the current candidate register following the completion of the steps shown in FIG. 12.

FIG. 13 is a diagram showing the steps of a second example embodiment of a method for post processing a table entry. The steps in FIG. 13 are performed by the process 520 as shown in FIG. 5, which is part of the Scheduler process 325 as shown in FIG. 3. In the example embodiment, the elements of FIG. 13 operate on the Scheduling Table 320 as shown in FIG. 3. Further in the example embodiment of FIG. 13, the format of the table entries corresponds with the format shown in FIG. 9.

The steps in FIG. 13 are performed by the Scheduler on the entry in the table which was selected by the selecting process 510 as shown in FIG. 5. The selected entry is the entry read from Scheduling Table and stored in the current candidate register by the Scheduler during the selecting process 510, and remaining in the candidate register at the end of the selecting process 510. The steps shown in FIG. 13 are performed by the Scheduler on the selected entry.

In step 1300 of FIG. 13, the Scheduler decrements the CS field value in the selected entry by the value of the TS field. Following step 1300, in step 1305, the Scheduler decrements the CP field value in the selected entry by the value of the TP field. Following step 1305, the Scheduler clears the CL field in step 1310. Following step 1310, in step 1315 the Scheduler clears the Transmit Enable bit in the selected entry. In this way the steps shown in FIG. 13 show an example of how the Scheduler Process 325 in FIG. 3 performs the step of post processing the selected table entry in step 520 as shown in FIG. 5.

THIRD EXAMPLE EMBODIMENT: COMBINED SCANNING AND SELECTING

In a third example embodiment, the Scanning step 505 and the Selecting step 510 of FIG. 5 are combined. Specifically, with reference to the embodiment shown in FIGS. 6 and 7, in step 630 of FIG. 6, rather than set a Transmit Enable bit, the steps 710 and 715 of FIG. 7 are performed for the current entry. Alternatively, with reference to the embodiment shown in FIGS. 11 and 12, steps 1210 and 1215 of FIG. 12 are performed within step 1135 of FIG. 11. In this way no transmit enable bit in the table entry is required, no setting or checking of a transmit enable bit is required, and the table is traversed once to accomplish both scanning and selecting.

Encoded Data Representation

An example method of encoded Data Representation for the herein described invention is now disclosed. In implementations using this encoded data representation, any field that is so encoded must be un-encoded to derive the value of that field. FIG. 14 shows an encoding for TS and TP. A four bit Exponent field 1405 (Exp) is shown in bits 8 through 11. An eight bit Period field 1410 is shown in bits 0 through 7. The frequency of transmission in Mbps specified by a given TS_Encoded (encoded TS value), for example, is then given by the following expression:

$$Frequency = 2^{(8-Exp)} * 169.9/(Period+256)$$

The above equation assumes that the period of the clock ticks used to trigger a scan of the scheduling table, for example the period of Timer 330 in FIG. 3, is equal to 2.5 microseconds. Therefore the value 169.6 in the above equation is the result of:

$$(53 \text{ Bytes/cell} * 8 \text{ bits/byte}) / (2.5 \text{ microseconds/cell time})$$

The system may alternatively be implemented using clock ticks of any frequency greater than or equal to the line rate, where the value of TS and TP are selected accordingly. For example if the scanning process is triggered each microsecond, and the link rate is one cell per 2.8 microseconds, and a given virtual circuit is allocated 50% of the total bandwidth for its sustainable rate, then the value of TS for that given virtual circuit is equal to 5.6. Whereas in contrast, if for the same link and virtual circuit the scanning were triggered every 2.8 microseconds, then the value of TS for that virtual circuit would be 2.

In an example embodiment, the period of the Timer 330 in FIG. 3 is programmable. In addition, the system may be configured to trigger a scan of the Scheduling Table in response to an input other than the expiration of the Timer 330. For example, the system may be configured to trigger a scan by the Scheduler Process 325 in response to link availability, such that a scan is performed only when the Scheduler detects that the link is available to transmit a cell.

The above equations show that the location of the binary point in the decoded (or unencoded) TS value is interpreted according to the value in the Exponent field 1405. Example values of the Exponent field 1405 are between 0 and 11, yielding frequencies between 41 Kbps and 169 Mbps, approximately.

During operation, the format in FIG. 14 allows specification of 12 different ranges in which the frequency may be specified. Within each range, the granularity of each step ranges from ~0.4% at the top of the range to ~0.2% at the bottom. In other words, any transmit rate may be specified to within ~0.2% accuracy, or to within 0.4% accuracy with a guarantee of not exceeding the specified rate.

FIG. 15 is a table having a first column 1505 of values from the Period field 1410 in FIG. 14, and a second column 1510 of corresponding rates in Mbps. The values in the second column 1510 are based on an Exponent field 1405 value of 0.

In the example embodiment of FIGS. 14, 15, and 16, the Virtual Circuit Table and Scheduling Table entry fields TS and TP are stored as TS_Encoded and TP_Encoded respectively, wherein TS_Encoded and TP_Encoded are of the format shown in FIG. 14. The subfields of TS_Encoded are referred to as Period_S and Exp_S, and the subfields within TP_Encoded are referred to as Period_P and Exp_P. If the TS and TP fields are encoded as TS_Encoded and TP_Encoded, then they must be unencoded before the value of TS or TP may be compared with the unencoded accumulator fields CS or CP.

For purposes of example, the CS and BS fields are 20 bits wide. The values and representations of the TS, CS and BS fields vary depending on the values of the Period and Exponent fields shown in FIG. 14. For example, the relationship of the format of fields within the Virtual Circuit table and Scheduling Table is shown in FIG. 16.

In FIG. 16, a first column 1605 shows Exponent field values. A second column 1610 shows a 12 bit TS value, and a third column 1615 shows the CS and BS values. The 'X's in TS represent the bits in the Period field of the encoded representation TS_Encoded as shown in FIG. 14. The 'X's in the CS and BS are the bits of the CS and BS parameters. The '.'s indicate the division between the integer portions and the fractional portions of the parameters.

Further for purposes of example, in the example embodiment of FIGS. 14, 15 and 16, the equation for the value of the BS field in the Virtual Circuit Table entry 1000 or in the Scheduling Table entry 900 is as follows:

$$BS = (MSB * (TS-TP)+TP) * 2^{(11-Exp\_S)}$$

where TS and TP are values decoded from the values TS_Encoded and TP_Encoded as follows:

$$TS = ((256+Period\_S) * 2^{Exp\_S})/256$$

$$TP = ((256+Period\_P) * 2^{Exp\_P})/256$$

Period_S is the value of the Period field within TS_Encoded,

Period_P is the value of the Period field within TP_Encoded,

Exp_S is the value of the Exp field within TS_Encoded,

Exp_P is the value of the Exp field within TP_Encoded, and

MBS is the Maximum Burst Size specified in the ATM UNI specification Generic Cell Rate Algorithm.

In another example embodiment, floating point operations are minimized in order to improve speed of the calculations. The following equation requires only integer operations, and assumes that Exp_S>=Exp_P (the sustained rate is less than or equal to the peak rate for the virtual circuit):

$$BS = (8 * MBS * ((Period\_S+256) * Scale\_factor - (Period\_P+ 256)) + 8 * (Period\_P+256))/Scale\_factor$$

where $$Scale\_factor = 2^{(Exp\_S-Exp\_P)}$$

SECOND ALTERNATIVE EMBODIMENT—VIRTUAL CIRCUIT TABLE TIMESTAMPS

A second alternative embodiment is now described including a system using timestamps within the Virtual Circuit Table. A Transmit Control Array (TCA) is used in the second alternative embodiment to store status information related to the packet currently at the head of a transmit queue. In the example embodiment, there is one TCA Entry associated with each transmit queue. In general, a TCA entry contains information regarding a packet that is to be transmitted, whereas a Scheduling Table entry contains information regarding the VC over which the packet is to be transmitted.

Figure 17:
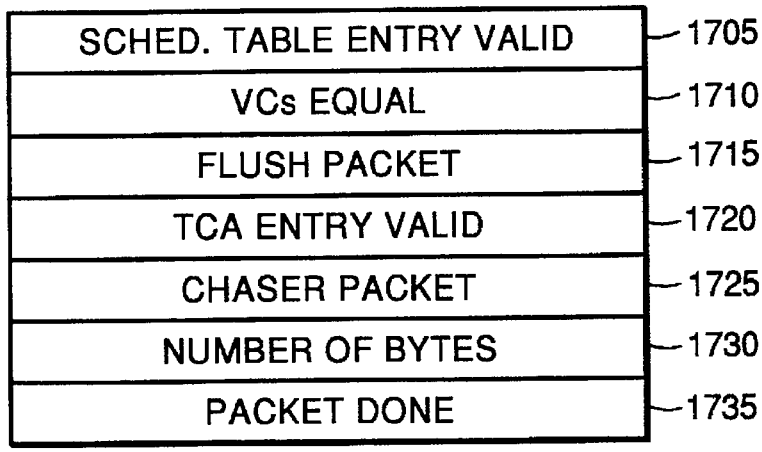
FIG. 17 is a diagram of an example embodiment of a Transmit Control Array Entry (TCA Entry) associated with a transmit queue.

FIG. 17 is a diagram of an example embodiment of a Transmit Control Array Entry (TCA Entry) 1700 associated with a packet at the head of a given transmit queue. The fields in the TCA Entry 1700 are written and maintained by a combination of the control logic 240 as shown in FIG. 3, and processes running on the Host CPU 210 as shown in FIG. 2, responsive to other information in the DRAM 225, the host memory 215, and the SRAM 316 as shown in FIG. 3. TCA Entry 1700 is shown including a Schedule Table Entry Valid field 1705, a Virtual Circuits Equal field 1710, a Flush Packet field 1715, a TCA Entry Valid field 1720, a Chaser Packet field 1725, a Number of Bytes field 1730, and a Packet done field 1735. For purposes of example, the TCA Entry 1700 is stored in the DRAM 225 as shown in FIG. 2. In an alternative embodiment, the TCA Entry is maintained in other memory storage within the Network Station 200, for example in on-chip memory within an Application Specific Integrated Circuit, or the SRAM 315 as shown in FIG. 3.

The Schedule Table Entry Valid field 1705 indicates whether or not the Schedule Table Entry associated with the Transmit Queue for the TCA Entry 1700 is valid. A valid Schedule Table Entry contains information regarding a packet that has not yet been completely transmitted. The Virtual Circuits Equal field 1710 indicates whether the Virtual Circuit indicated by the Schedule Table Entry associated with the Transmit Queue for the TCA Entry 1700 is the same as the Virtual Circuit of the packet or cell for which the TCA Entry 1700 contains information. The Flush Packet field 1715 indicates whether a packet for which information is contained in the TCA Entry 1700 should be flushed. A packet must be flushed when it is to be transmitted onto a VC which has no flow control credits and is not likely to be replenished with credits in the near future. Flow control credits may be lost as a result of network data corruption. The TCA Entry Valid field 1720 indicates whether the TCA Entry 1700 is valid. A valid TCA Entry contains information regarding a packet that has not yet been completely transmitted. The Chaser Packet field 1725 indicates whether a packet at the head of the transmit queue associated with the TCA Entry 1700 is a chaser packet. A chaser packet for a given VC is queued behind all other packets of that VC on a given queue when the VC is to be closed. The Number of Bytes field 1730 contains the number of bytes of the packet that are currently stored in the FIFO associated with the Transmit Queue associated with the TCA Entry 1700. The Packet Done field 1735 indicates whether the end of the packet for which information is contained in TCA Entry 1700 has been placed in to the FIFO associated with the Transmit Queue associated with the TCA Entry 1700.

Figure 18:
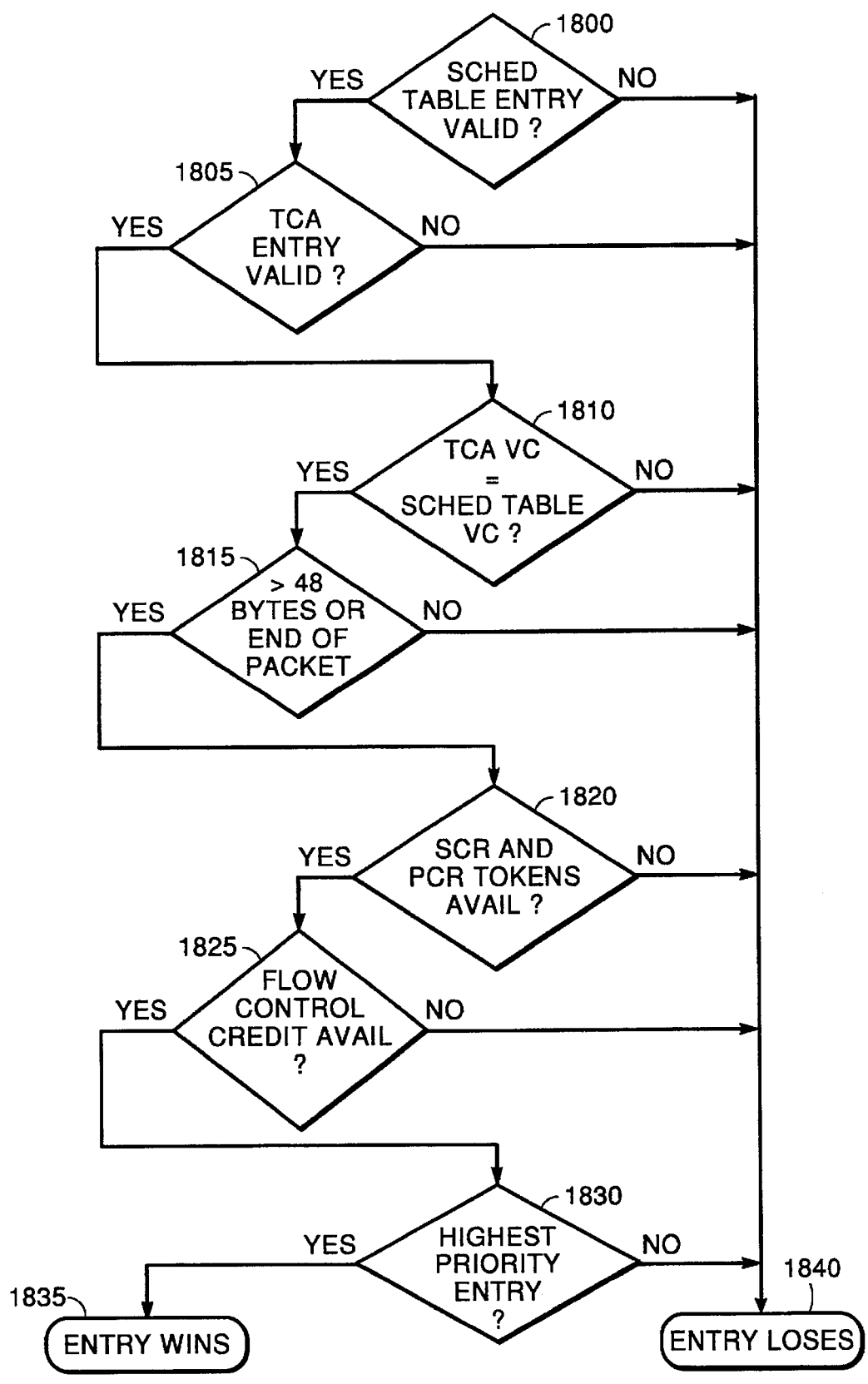
FIG. 18 is a diagram of steps performed by a third example embodiment of a method for selecting a virtual circuit for transmission.

FIG. 18 is a diagram of steps performed by a third example embodiment of a method for selecting a virtual circuit for transmission. The steps shown in FIG. 18 are performed by the process corresponding with step 510 in FIG. 5, which is contained within the Scheduler Process 325 as shown in FIG. 3. The steps shown in FIG. 18 select one Schedule Table entry from those entries indicating a VC on which a cell may be transmitted without exceeding the QoS parameters for that VC. The steps of FIG. 18 are performed iteratively on all Schedule Table entries. If an entry is found to "win" by the steps shown in FIG. 18, then that entry is written into a "current candidate" register maintained by the Scheduler. The Schedule Table entry contained in the current candidate register after the steps of FIG. 18 have been performed on all Schedule Table entries indicates the next VC on which a transmission may be made.

In step 1800 of FIG. 18, the Scheduler determines if the Schedule Table entry is valid. A Schedule Table entry is valid if it indicates a packet which has not been completely transmitted. The determination of step 1800 is made by reading the Schedule Table Entry Valid field in the TCA Entry for the transmit queue associated with the Schedule Table entry. If the Schedule Table entry is valid, step 1800 is followed by step 1805. If the Schedule Table entry is not valid, then step 1800 is followed by step 1840. In step 1805, the Scheduler determines if the TCA Entry for the Transmit Queue associated with the Schedule Table entry is valid. The determination of step 1805 is made by reading the TCA Entry Valid field in the TCA Entry for the transmit queue associated with the Schedule Table entry. A TCA Entry is valid if it indicates a packet at the head of the transmit queue which has not been fully transmitted. If that TCA Entry is valid, step 1805 is followed by step 1810. If that TCA Entry is not valid, then step 1810 is followed by step 1840.

In step 1810 of FIG. 18, the Scheduler determines whether the TCA Entry related to the packet at the head of the queue associated with the Schedule Table entry being examined indicates a Virtual Circuit which is the same as the Virtual Circuit currently indicated by the Schedule Table entry being examined. The determination of step 1810 is made by reading the Virtual Circuits Equal field in the TCA Entry for the transmit queue associated with the Schedule Table entry. If the two Virtual Circuits are equal, then step 1810 is followed by step 1815. If the two Virtual Circuits are not equal, then step 1810 is followed by step 1840.

In step 1815 of FIG. 18, the Scheduler determines whether there are greater than 48 bytes remaining of data in the FIFO of the current packet at the head of the transmit queue associated with the Schedule Table entry being examined, or whether the end of that packet has been placed into the FIFO. The determination of step 1815 is made by reading the Number of Bytes and Packet Done fields in the TCA Entry for the transmit queue associated with the Schedule Table entry. If either condition is true, then step 1815 is followed by step 1820. If neither condition is true, then step 1815 is followed by step 1840.

In step 1820 of FIG. 18, the Scheduler determines whether there are Sustained Cell Rate and Peak Cell Rate tokens available for the Virtual Circuit indicated by the Schedule Table entry being examined. If both Sustained Cell Rate and Peak Cell Rate tokens are available for that Virtual Circuit, then step 1820 is followed by step 1825. A Sustained Cell Rate token is available when the value of the CS field in the Schedule Table entry is greater than or equal to the value of the TS field. Similarly, a Peak Cell Rate token is available when the value of the CP field in the Schedule Table entry is greater than or equal to the value of the TP field. If either Sustained Cell Rate or Peak Cell rate tokens are not available for that Virtual Circuit, then step 1820 followed by step 1840.

In step 1825 of FIG. 18, the Scheduler determines whether at least one flow control credit is available for the Virtual Circuit indicated by the Schedule Table entry being examined, and whether the packet at the head of the Transmit Queue associated with the current Schedule Table entry is to be flushed, and whether that packet is a chaser packet. It will be evident to one skilled in the art that various flow control mechanisms may be employed consistent with the principles of the invention. Generally, no flow control credit is required to transmit a chaser packet, or a packet that is to be flushed. Otherwise, a flow control credit is required to transmit a cell. The determination of step 1825 is made by reading the Chaser Packet and Flush Packet fields of the TCA Entry for the transmit queue associated with the Schedule Table entry. Also, a Credit Available field may be included in the Virtual Circuit table entry of the virtual circuit indicated by the Schedule Table entry. The Scheduler determines whether a flow control credit is available by reading the Credit Available field. If a flow control credit is available, or that packet is to be flushed, or that packet is a chaser packet, then step 1825 is followed by step 1830. If none of those three conditions are true, then step 1825 is followed by step 1840.

In step 1830, the Scheduler determines whether the priority indicated by the Schedule Table entry being examined is higher than the priority of the Schedule Table entry currently stored in the current candidate register. The priority of a Schedule Table entry is determined by comparing both the Priority field and the Latency Accumulator fields of that Schedule Table entry with those of the current candidate. If the priority of the Schedule Table entry being examined is higher, or the priority is equal but the Latency Accumulator field value of the Schedule Table entry being examined is higher, then step 1830 is followed by step 1835. If the priority of the Schedule Table entry being examined is less than that of the current candidate, then step 1830 is followed by step 1840. In step 1830, the Scheduler writes the value of the Schedule Table entry currently being examined into the current candidate register and then reads the next Schedule Table entry. In step 1840, the Scheduler does not write a new value to the current candidate register, and simply reads the next Schedule Table entry. The steps shown in FIG. 18 are repeated until they have been performed on all Schedule Table entries. The result of the steps shown in FIG. 18 is that the current candidate register indicates a Virtual Circuit on which the next transmission may be made.

Figure 19:
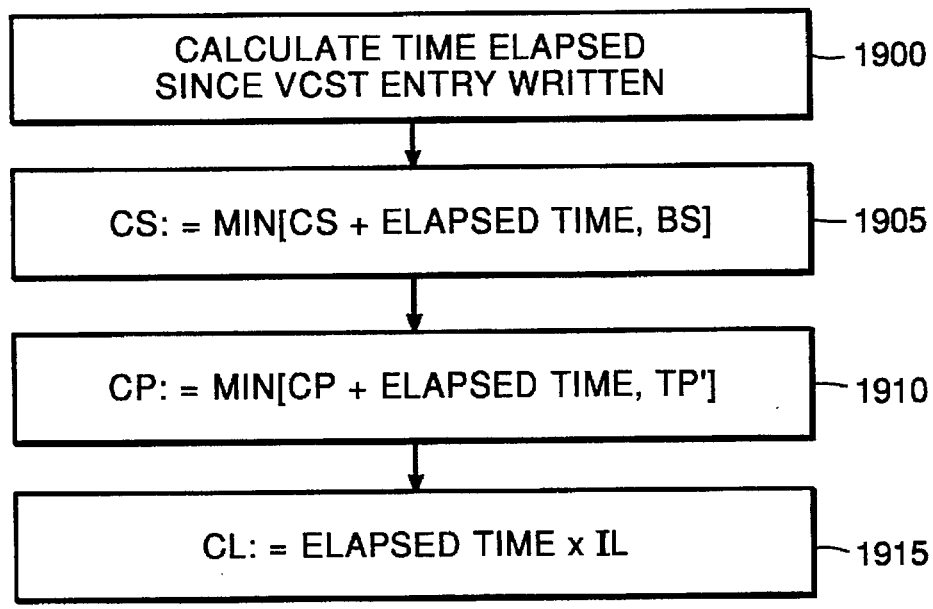
FIG. 19 is a diagram of steps performed by an example embodiment of a process for loading a Schedule Table Entry.

FIG. 19 is a flow diagram of steps performed by an example embodiment of a process for loading a Schedule Table Entry. During operation, when the Scheduler detects that a new packet ready for transmission is at the head of a Transmit Queue, the Scheduler determines which Scheduling Table Entry corresponds with the Transmit Queue of the pending transmission. Next, the Scheduler determines which VC the new packet is to be transmitted on. If the VC on which the new packet is to be transmitted is not equal to the VC currently indicated by the Scheduling Table entry corresponding with the Transmit Queue of the pending transmission, then the steps shown in FIG. 19 are performed. The Scheduler then performs the steps shown in FIG. 19 using the values from the fields of the Virtual Circuit Table entry for that VC, and the Scheduling Table entry corresponding with the transmit queue of the pending transmission.

In step 1900 of FIG. 19, the Scheduler calculates the time elapsed since the Virtual Circuit Table entry was last written. This is done by subtracting the value of the Timestamp field in the Virtual Circuit Table entry from the value of the Current Time. For example, the Current Time may be defined as the total accumulated time since the system was last initialized. As described previously, the Timestamp field in the Virtual Circuit Table entry is written with the value of the Current Time whenever the Virtual Circuit Table Entry is written. For purposes of example, the time calculated in step 1900 is herein referred to as Elapsed Time.

Following step 1900, in step 1905, the Scheduler calculates a new value for the CS field in the Schedule Table entry. The new CS value is equal to the minimum of either (1) the CS field value in the Virtual Circuit Table entry plus Elapsed Time, or (2) the value of the BS field in the Virtual Circuit Table entry. The new CS value is then written to the CS field in the Schedule Table entry.

Next, after step 1905, in step 1910 the Scheduler calculates a new value for the CP field in the Schedule Table entry. The new CP value is equal to the minimum of either (1) the value of the CP field in the Virtual Circuit Table entry plus Elapsed Time, or (2) TP', where TP' equals the value of TP obtained from the TP field in the Virtual Circuit Table entry plus 1, minus the least significant bit. The new value of CP is then written into the CP field of the Schedule Table entry.

Note that the maximum value of CP, as a result of the steps 1120 and 1125 in FIG. 11, is equal to TP+1 minus the value of the least significant bit of TP. For example, in step 1120, the value of CP may be equal to at most the value of TP minus the least significant bit, if step 1125 is to be executed. After step 1125, CP would then be equal to TP plus 1, also minus the least significant bit. After a cell is subsequently transmitted in that case, CP is decremented by the value of TP (see step 1305 in FIG. 13). If CP were allowed to increase until it were equal to TP+1, then another cell could potentially be transmitted before a sufficient time period has passed to ensure that the Peak Cell Rate is not exceeded.

CP is therefore allowed to increase in value until it is less than TP by a difference equal to the least significant bit of TP. This relationship must be maintained in order that the negotiated Peak Cell Rate for that Virtual Circuit is not exceeded. Therefore, in Step 1910, the least significant bit is subtracted when calculating TP'.

Step 1910 is followed by step 1915. In step 1915, the Scheduler calculates a new value for the CL field in the Scheduler Table entry. The new value for CL is equal to the value of the IL field in the Virtual Circuit Table entry multiplied by Elapsed Time. Note that for purposes of example, Elapsed Time must be stored in terms of the same time interval as is used to scan the Schedule Table for step 1915 to work as described. It will be evident to one skilled in the art that Elapsed Time may be also be stored in other representations, requiring additional calculation during step 1915. The new value of CL is then written into the CL field of the Schedule Table entry.

The disclosed system provides a significant advantage by avoiding multiplies when loading the CP and CS fields in the Schedule Table. In steps 1905 and 1910 of FIG. 19, the Elapsed Time value is simply added to the CS and CP fields respectively, rather than requiring a multiplication of the time unit of Elapsed Time by the increment values for sustained rate and peak rate. This advantage flows from using the TS and TP fields to store a number of clock ticks that must pass before a cell may be transmitted on that virtual circuit.

In an alternative embodiment, CL may be defined as accumulated latency only between cells within a single packet on a VC. In that alternative embodiment, the value of CL is set to zero when an entry in the Scheduling Table is loaded from the Virtual Circuit table.

Writing the Virtual Circuit Table

Figure 20:
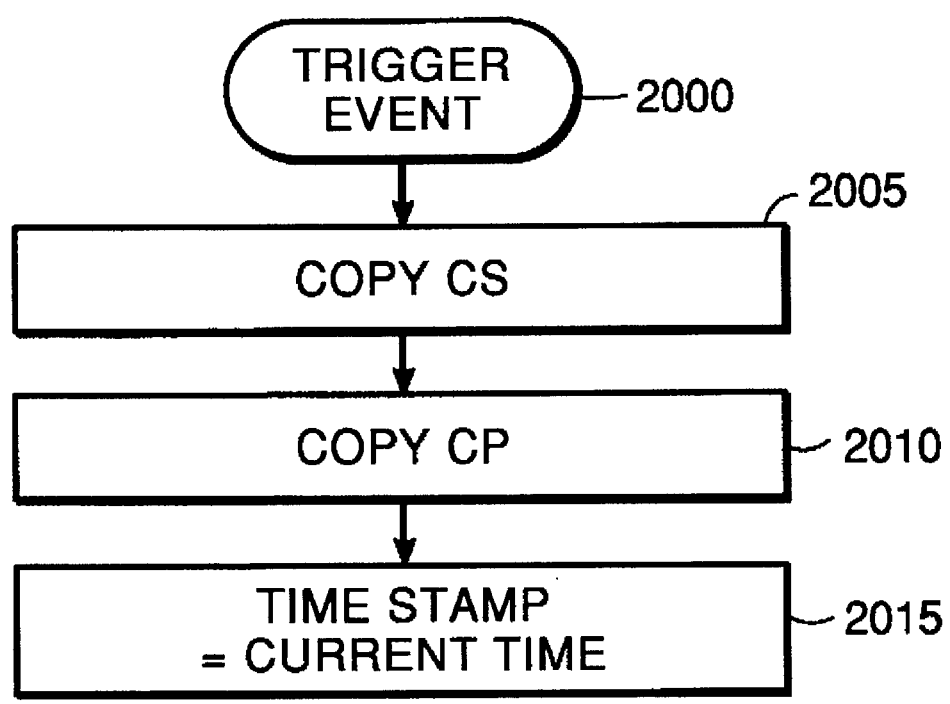
FIG. 20 is a flow chart of a process for writing a Virtual Circuit Table entry.

FIG. 20 is a flow diagram of the process for writing an entry in the Virtual Circuit table. The process shown in FIG. 20 may be implemented either within an Application Specific Integrated Circuit or as a program running on a microprocessor in the network adapter. The process shown in FIG. 20 is, for purposes of example, included within the Scheduler Process 325 as shown in FIG. 3. During operation of the elements of FIG. 20, a trigger event 2000 occurs that begins the process of FIG. 20. A first example of the trigger event 2000 is detection by the Scheduler, responsive to the transmit process 305 as shown in FIG. 3, that the last cell in a packet has been transmitted. After the Scheduler detects that the last cell has been transmitted, then in step 2005 the Scheduler copies the value from the CS 940 field in the Schedule Table entry for the packet that was just transmitted into the CS 1005 field of the Virtual Circuit Table Entry 1000 corresponding with the virtual circuit over which the packet was transmitted.

Following step 2005, the Scheduler copies the value of the CP 960 field from that Scheduling Table Entry into the CP field 1010 of the Virtual Circuit Table Entry 1000 corresponding with the virtual circuit over which the packet was transmitted. After step 2010, in step 2015, the Scheduler then writes the value of the current time into the Time Stamp field 1040 in the Virtual Circuit Table Entry 1000.

In a second example embodiment, the trigger condition 2000 is the Scheduler detecting when a new packet as indicated by an entry at the head of a transmit queue. In that second example embodiment, the Virtual Circuit Table Entry 1000 further includes a Latency Accumulator field. Further in the second example embodiment, in addition to the steps of FIG. 20, the Scheduler performs an additional step of copying the value of the Latency Accumulator field CL 925 into the Latency Accumulator field of the Virtual Circuit Table Entry. Also in the second example embodiment, the Scheduler adds the value of the Latency Accumulator in the Virtual Circuit table entry to the product of the Elapsed Time and the Latency Increment for that Virtual Circuit, and writes the result to the Latency Accumulator field in the Scheduler Table entry whenever a Schedule Table entry is loaded from the Virtual Circuit table entry.

While the invention has been described with reference to specific example embodiments, the description is not meant to be construed in a limiting sense. Various modifications of the disclosed embodiment, as well as other embodiments of the invention, will be apparent to person skilled in the art upon reference to this description. It is therefore contemplated that the appended claims will cover any such modifications or embodiments which fall within the true scope of the invention.

We claim:

1. A system for controlling the transmission of cells from a network node, comprising:

a virtual circuit table having one or more entries, each entry corresponding with a virtual circuit established with said network node, each entry having a first Cell Rate Accumulator field and a Time Stamp field, said Time Stamp field storing a time at which said virtual circuit table entry was last written;

a schedule table having one or more entries, each entry having a first Cell Rate Accumulator field and a first Predetermined Value field;

schedule table loading means for determining a virtual circuit on which a packet is to be transmitted, calculating a time elapsed since a last previous write of a virtual circuit table entry corresponding with said virtual circuit, said time elapsed equal to the current time minus the value of said Time Stamp field, adding said time elapsed to the value of said first Cell Rate Accumulator field in said virtual circuit table entry corresponding with said virtual circuit, and storing the result of said addition into said first Cell Rate Accumulator field of a schedule table entry;

scanning means for periodically incrementing said first cell Rate Accumulator field in said schedule table entry; and transmitting means, responsive to said scanning means, for transmitting a cell on said virtual circuit when the value of said first Cell Rate Accumulator field value is greater than or equal to the value of said first Predetermined Value field.

2. The system as in claim 1, further comprising:

a memory;

one or more transmit queues in said memory, each said transmit queue associated with one of said schedule table entries, each said transmit queue including zero or more entries, each of said zero or more transmit queue entries indicating a packet in a memory; and wherein said schedule table loading means is responsive to a transmit queue entry arriving at the head of one of said one or more transmit queues, said transmit queue entry indicating said packet to be transmitted.

3. The system as in claim 2, further comprising:

virtual circuit table loading means, responsive to said transmit queue entry arriving at the head of said one of said one or more transmit queues, for storing a value from said first Cell Rate Accumulator field in said schedule table entry to said first Cell Rate Accumulator field of said virtual circuit table entry corresponding with said virtual circuit, and for storing a current time value to said Time Stamp field of said virtual circuit table entry corresponding with said virtual circuit.

4. The system as in claim 1, further comprising:

virtual circuit table loading means, responsive to said transmitting means having transmitted a last cell of a packet, for storing a value from said first Cell Rate Accumulator field of said schedule table entry to said first Cell Rate Accumulator field of said virtual circuit table entry corresponding with said virtual circuit, and for storing a current time value to said Time Stamp field of said virtual circuit table entry corresponding with said virtual circuit.

5. The system as in claim 1, further comprising:

each of said one or more virtual circuit table entries having a Bucket Size field;

said schedule table loading means further determining the minimum of (1) the sum of said Time Elapsed field value and said value of said first Cell Rate Accumulator field in said virtual circuit table entry corresponding with said virtual circuit, and (2) the value of said Bucket Size field; and said schedule table loading means further storing said minimum into said first Cell Rate Accumulator field of said schedule table entry.

6. The system as in claim 1, wherein the value of said first Predetermined Value field for a given one of said one or more schedule table entries equals the inverse of a predetermined sustainable cell rate limit for a virtual circuit indicated by said given one of said one or more schedule table entries divided by a time period T, and said scanning means increments said first Cell Rate Accumulator field each time period T by adding an increment value to said first Cell Rate Accumulator field value, said increment value equal to 1.

7. The system as in claim 1, further comprising:

each of said one or more virtual circuit table entries having a latency accumulator field and a latency increment field;

each of said one or more schedule table entries having a latency accumulator field; and said schedule table loading means multiplying said time elapsed by the value of said latency increment field in said virtual circuit table entry corresponding with said virtual circuit, and storing the result of said multiplication into said latency accumulator field of said schedule table entry.

8. The system of claim 7, said schedule table loading means further copying said latency increment field value in said virtual circuit table entry corresponding with said virtual circuit into a latency increment field of said schedule table entry corresponding with said one of said one or more transmit queues.

9. The system of claim 1, wherein the value of said first Predetermined Value field for each of said one or more entries equals 1, and said scanning means increments said first Cell Rate Accumulator field of said schedule table entry every time period T by adding an increment value to said first Cell Rate Accumulator field value, wherein said increment value equals a number of cells that may be transmitted by said network node during said time period T on a virtual circuit indicated by said schedule table entry, and not exceed a predetermined sustainable rate of transmission permitted for said indicated virtual circuit.

10. The system as in claim 1, further comprising:
each of said one or more schedule table entries having a latency accumulator field; and
said schedule table loading means storing zero into said latency accumulator field of said schedule table entry.

11. The system as in claim 1, further comprising:
each of said one or more virtual circuit table entries having a second Cell Rate Accumulator field;
each of said one or more schedule table entries having a second Cell Rate Accumulator field and a second Predetermined Value field; and
said schedule table loading means adding said time elapsed to a value of said second Cell Rate Accumulator field in said virtual circuit table entry corresponding with said virtual circuit, and storing the result of said addition into said second Cell Rate Accumulator field of said schedule table entry.

12. The system as in claim 11, further comprising:
said schedule table loading means further determining the minimum of
(1) the sum of said time elapsed and said value of said second Cell Rate Accumulator field in said virtual circuit table entry corresponding with said virtual circuit, and
(2) the value of said second Predetermined Value field plus one minus the least significant bit; and
said schedule table loading means storing said minimum into said second Cell Rate Accumulator field of said schedule table entry.

13. The system of claim 11, wherein the value of said second Predetermined Value field for a given one of said one or more entries equals the inverse of a predetermined peak cell rate limit for the virtual circuit indicated by said schedule table entry divided by a time period T, and said scanning means increments said second Cell Rate Accumulator each time period T by adding an increment value to said second Cell Rate Accumulator field value, said increment value equal to 1.

14. The system of claim 13, wherein the value of said second Predetermined Value field for each of said one or more entries equals 1, and said scanning means increments said second Cell Rate Accumulator field of a given schedule table entry each time period T by adding an increment value to said second Cell Rate Accumulator field value, said increment value equal to a number of cells that may be transmitted on a virtual circuit indicated by said given schedule table entry during said time period T and not exceed a predetermined peak rate of transmission permitted for said indicated virtual circuit.

15. The system as in claim 13, claim 9, or claim 14, wherein said time period T is equal to one cell time, where said cell time is a time period equal to the amount of time required by said network node to transmit one cell onto said network.

16. A method for controlling the transmission of cells from a network node, said network node including a virtual circuit table having one or more entries, each entry corresponding with a virtual circuit established with said network node, each entry having a first Cell Rate Accumulator field and a Time Stamp field, said network node further including a schedule table having one or more entries, each entry having a first Cell Rate Accumulator field and a first Predetermined value field, comprising the steps of:
determining a virtual circuit on which a packet is to be transmitted;
calculating a time elapsed since a last previous write of a virtual circuit table entry corresponding with said virtual circuit, said time elapsed equal to the current time minus a value of said Time Stamp field, said value of said Time Stamp field storing a time at which said virtual circuit table entry was last written;
adding said time elapsed to the value of said first Cell Rate Accumulator field in said virtual circuit table entry corresponding with said virtual circuit;
storing the result of said addition into said first Cell Rate Accumulator field of a Schedule table entry;
periodically incrementing said first Cell Rate Accumulator field in said schedule table entry; and
transmitting a cell on said virtual circuit when the value of said first Cell Rate Accumulator field value is greater than or equal to said first Predetermined Value field value.

17. The method as in claim 16, said network node also including a memory and one or more transmit queues in said memory, each said transmit queue associated with one of said schedule table entries, each said transmit queue including zero or more entries, each of said zero or more transmit queue entries indicating a packet in a memory, wherein said determining, calculating, adding and storing steps are responsive to a transmit queue entry arriving at the head of one of said one or more transmit queues, said transmit queue entry indicating said packet to be transmitted.

18. The method as in claim 17, further comprising the following steps:
storing, responsive to said transmit queue entry arriving at the head of said one of said one or more transmit queues, a value from said first Cell Rate Accumulator field in said schedule table entry to said first Cell Rate Accumulator field of said virtual circuit table entry corresponding with said virtual circuit; and
storing a current time value to said Time Stamp field of said virtual circuit table entry corresponding with said virtual circuit.

19. The method as in claim 16, further comprising the steps of:
storing, responsive to transmitting means a last cell of a packet, a value from said first Cell Rate Accumulator field of said schedule table entry to said first Cell Rate Accumulator field of said virtual circuit table entry corresponding with said virtual circuit, and for storing a current time value to said Time Stamp field of said virtual circuit table entry corresponding with said virtual circuit.

20. The method as in claim 16, each of said one or more virtual circuit table entries having a Bucket Size field, further comprising the steps of:

determining the minimum of
(1) the sum of said time elapsed and said value of said first Cell Rate Accumulator field in said virtual circuit table entry corresponding with said virtual circuit, and
(2) the value of said Bucket Size field; and storing said minimum into said first Cell Rate Accumulator field of said schedule table entry.

21. The method as in claim 16, each of said one or more virtual circuit table entries having a second Cell Rate Accumulator field, and each of said one or more schedule table entries having a second Cell Rate Accumulator field and a second Predetermined Value field, further comprising the steps of:

adding said time elapsed to a value of said second Cell Rate Accumulator field in said virtual circuit table entry corresponding with said virtual circuit; and storing the result of said addition into said second Cell Rate Accumulator field of said schedule table entry.

22. The method as in claim 21, further comprising the steps of:

determining the minimum of
(1) the sum of said time elapsed and said value of said second Cell Rate Accumulator field in said virtual circuit table entry corresponding with said virtual circuit, and
(2) the value of said second Predetermined Value field plus one minus the least significant bit; and storing said minimum into said second Cell Rate Accumulator field of said schedule table entry.

23. The method as in claim 16, wherein the value of said first Predetermined Value field for a given one of said one or more schedule table entries equals the inverse of a predetermined sustainable cell rate limit for a virtual circuit indicated by said given one of said one or more schedule table entries divided by a time period T, and said periodic incrementing step increments said first Cell Rate Accumulator field each time period T by adding an increment value to said first Cell Rate Accumulator field value, said increment value equal to 1.

* * * * *